(12) United States Patent
Yasuda et al.

(10) Patent No.: US 10,549,346 B2
(45) Date of Patent: Feb. 4, 2020

(54) THREE-DIMENSIONAL MODELING APPARATUS, THREE-DIMENSIONAL MODEL BODY MANUFACTURING METHOD, AND THREE-DIMENSIONAL MODELING DATA

(71) Applicant: CANON KABUSHIKI KAISHA, Tokyo (JP)

(72) Inventors: Shinya Yasuda, Yokohama (JP); Kimihiro Fujimoto, Kawasaki (JP); Dexu Zhang, Yokohama (JP); Takamune Suzuki, Yokohama (JP); Toshihiro Takai, Oyama (JP); Yutaka Takahashi, Kawasaki (JP); Takahiro Harigae, Bando (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 345 days.

(21) Appl. No.: 15/464,636

(22) Filed: Mar. 21, 2017

(65) Prior Publication Data
US 2017/0282245 A1    Oct. 5, 2017

(30) Foreign Application Priority Data

Mar. 30, 2016  (JP) ................................. 2016-068675
Jul. 15, 2016   (JP) ................................. 2016-140690

(51) Int. Cl.
*B22F 3/105*   (2006.01)
*B33Y 30/00*   (2015.01)
*B33Y 10/00*   (2015.01)

(52) U.S. Cl.
CPC ............ *B22F 3/1055* (2013.01); *B33Y 10/00* (2014.12); *B33Y 30/00* (2014.12)

(58) Field of Classification Search
CPC .......... B22F 3/1055; B22F 2003/1056; B29C 64/153; B29C 64/371; B33Y 30/00; B33Y 10/00; Y02P 10/295
(Continued)

(56) References Cited

U.S. PATENT DOCUMENTS 9,592,636 B2    3/2017  Araie et al.
2004/0003738 A1* 1/2004 Imiolek ................. B22F 3/1055
                                                   101/480
(Continued)

FOREIGN PATENT DOCUMENTS

JP      2010-265530 A    11/2010
JP         5721887 B1     5/2015
JP         5764751 B2     8/2015

*Primary Examiner* — Jessee R Roe
*Assistant Examiner* — Rebecca Janssen
(74) *Attorney, Agent, or Firm* — Venable LLP

(57) ABSTRACT

In a three-dimensional modeling apparatus, diffusion of fumes generated around the modeling stage accompanying irradiation with an energy beam can be efficiently prevented. Three-dimensional modeling is performed by repeating scanning a modeling material arranged on a modeling stage with laser light to form a solidified layer. A cover is provided that locally surrounds an irradiation portion on the modeling material arranged on the modeling stage irradiated with the laser light, and suppresses diffusion of the fumes caused by irradiation with the laser light. In the cover, a stream of gas containing the fumes is regulated so as to cause the fumes to flow toward an upward portion inside the cover apart from the irradiated portion irradiated with the laser light.

13 Claims, 15 Drawing Sheets

(58) Field of Classification Search
USPC .......................................................... 419/53
See application file for complete search history.

(56) References Cited

U.S. PATENT DOCUMENTS

2014/0175708 A1* 6/2014 Echigo .................. B22F 3/1055
264/460
2018/0147654 A1* 5/2018 Kitamura ............... B33Y 30/00

* cited by examiner

THREE-DIMENSIONAL MODELING APPARATUS, THREE-DIMENSIONAL MODEL BODY MANUFACTURING METHOD, AND THREE-DIMENSIONAL MODELING DATA

CROSS REFERENCE TO RELATED APPLICATIONS

This application claims the benefit of Japanese Patent Application No. 2016-068675, filed Mar. 30, 2016, and Japanese Patent Application No. 2016-140690, filed Jul. 15, 2016, which are hereby incorporated by reference herein in their entirety.

BACKGROUND OF THE INVENTION

Field of the Invention

The present invention relates to a three-dimensional modeling apparatus that performs three-dimensional modeling by repeating a step of scanning a modeling material arranged on a modeling stage with an energy beam to form a solidified layer.

Description of the Related Art

A three-dimensional modeling apparatus that uses a powder bed fused bonding method, is one of three-dimensional layer-stacking modeling technique schemes, and is called a three-dimensional printer, has been implemented. This type of three-dimensional modeling apparatus performs three-dimensional modeling by repeating a step of selectively, radiationally heating material powder laid by a powder spreading roller with an energy beam to solidify the powder, thus stacking multiple layers. For example, a laser beam is used as the energy beam for heating and solidifying the material powder. In the following description, a case is mainly referred to where the energy beam for modeling is laser light and where the generation source of the beam is a laser light source.

There are apparatuses that require inert gas as an atmosphere or require a decompressed atmosphere. In such cases, a chamber is required to hold the atmosphere around the modeling stage. In this configuration, for example, a powder spreading roller for material powder or a roller and a modeling stage are arranged in the chamber. A laser unit is arranged outside of the chamber. An irradiation area on the modeling stage is scanned through a light transmitting window provided at the chamber.

At the same time when the material powder is fused with laser in modeling through laser irradiation, smoky material called fumes, for example, metal vapor or resin vapor is emitted. A problem has been known; that is, if this emission is left, repetitive layer formation finally fills the inside of the chamber with a large amount of fumes, which adhere onto the laser transmitting window and dwell on the laser optical path. In this case, phenomena, such as change in the refractive index of the surface of the light transmitting window for laser transmission provided at the chamber, and reduction in the energy density of laser that can reach the modeling stage, occur. The phenomena have a possibility of affecting the model body processing quality, for example, modeling accuracy. In an extreme case, there is a possibility that the modeling operation itself becomes impossible.

On fumes caused accompanying irradiation with laser, a configuration as in the following Japanese Patent Application Laid-Open No. 2010-265530 has been proposed. Japanese Patent Application Laid-Open No. 2010-265530 discloses a configuration that has a smaller area than a laser processing area does and includes, on a top surface, a window allowing a laser to pass, and performs laser processing in a cover frame with a lower portion being open. Furthermore, Japanese Patent Application Laid-Open No. 2010-265530 refers to a configuration that supplies atmospheric gas from a gas tank into the inside of the cover frame, causes a gas collector connected to the cover frame to collect the inner atmospheric gas, suppresses dwelling of the fumes in the cover frame, and suppresses diffusion and attenuation of the laser.

Unfortunately, according to the configuration of Japanese Patent Application Laid-Open No. 2010-265530, the timing of gas supply and gas collection and flow rate balance can cause the inside of the cover frame to have a positive pressure. Consequently, there are problems in that fumes flow out of the cover frame beyond the bottom of this frame, and fumes dwell on the laser optical path. Furthermore, there is a possibility that fumes that have not been collected by the gas collector and dwell adhere onto the window on the top surface of the cover frame that allows a laser beam to pass.

SUMMARY OF THE INVENTION

In view of the above problems, the present invention has an object to allow the three-dimensional modeling apparatus to be capable of efficiently preventing diffusion of fumes caused around the modeling stage accompanying irradiation with an energy beam.

According to an aspect of the present invention, a three-dimensional modeling apparatus that performs three-dimensional modeling by repeatedly scanning a modeling material arranged on a modeling stage with an energy beam to form a solidified layer, comprises: a cover that includes an energy beam transmitting portion that allows the energy beam to pass, locally surrounds a portion of the modeling material arranged on the modeling stage irradiated with the energy beam, and suppresses diffusion of fumes generated by irradiation of the energy beam; and a stream regulating mechanism that regulates a stream of gas containing the fumes so as to cause the fumes to be apart from the portion of the modeling material irradiated with the energy beam.

According to a further aspect of the present invention, a three-dimensional modeling apparatus that performs three-dimensional modeling by repeatedly scanning a modeling material arranged on a modeling stage with an energy beam to form a solidified layer, comprises: a cover that includes an energy beam transmitting portion that allows the energy beam to pass, locally surrounds an irradiation position on the modeling material arranged on the modeling stage irradiated with the energy beam, and suppresses diffusion of fumes generated by irradiation of the energy beam; and a moving device that moves the cover so as to allow the energy beam to pass through the energy beam transmitting portion, according to scanning with the energy beam.

According to the above configuration, in the three-dimensional modeling apparatus, the cover and a stream regulating mechanism of the cover can effectively prevent diffusion of the fumes occurring around the modeling stage accompanying irradiation with the energy beam. In particular, the stream regulating mechanism of the cover can regulate the gas containing the fumes so as to flow apart upward in the cover, remove the fumes from the portion irradiated with the energy beam, and suppress diffusion of the fumes from a lower portion of the cover.

Further features of the present invention will become apparent from the following description of exemplary embodiments with reference to the attached drawings.

DETAILED DESCRIPTION OF THE INVENTION

Hereinafter, referring to exemplary embodiments illustrated in the accompanying drawings, the embodiments of implementation of the present invention are described. The embodiments described below are examples. For example, the detailed configuration can be appropriately changed by those skilled in the art in a range without departing from the spirit of the present invention. Numeric values described in the embodiments are numeric values for reference and are not limit the present invention.

Embodiment 1

Figure 1:
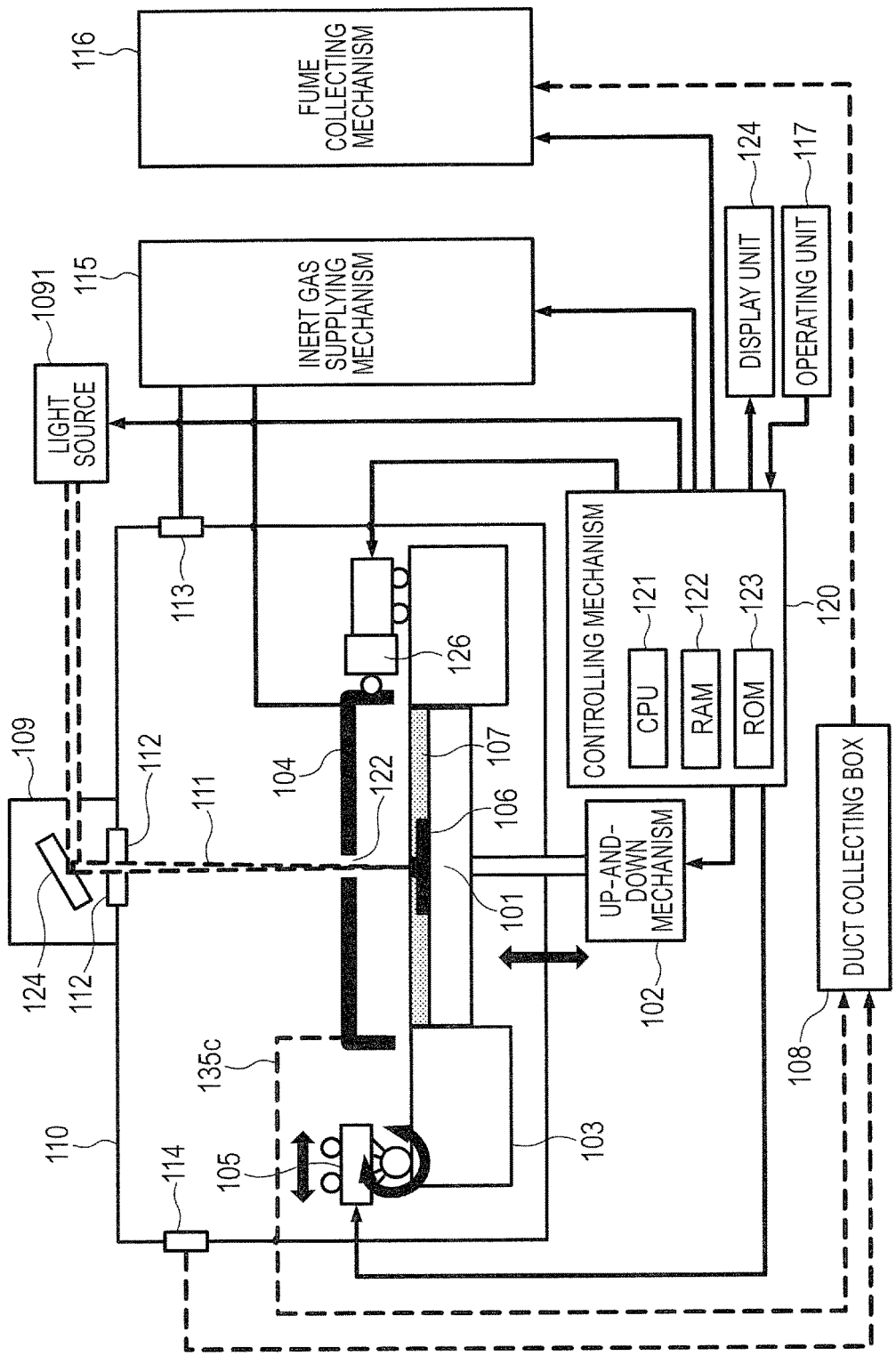
FIG. 1 is a diagram illustrating a configuration of a three-dimensional modeling apparatus that can implement Embodiments 1 to 3 which are embodiments of the present invention.
Figure 2:
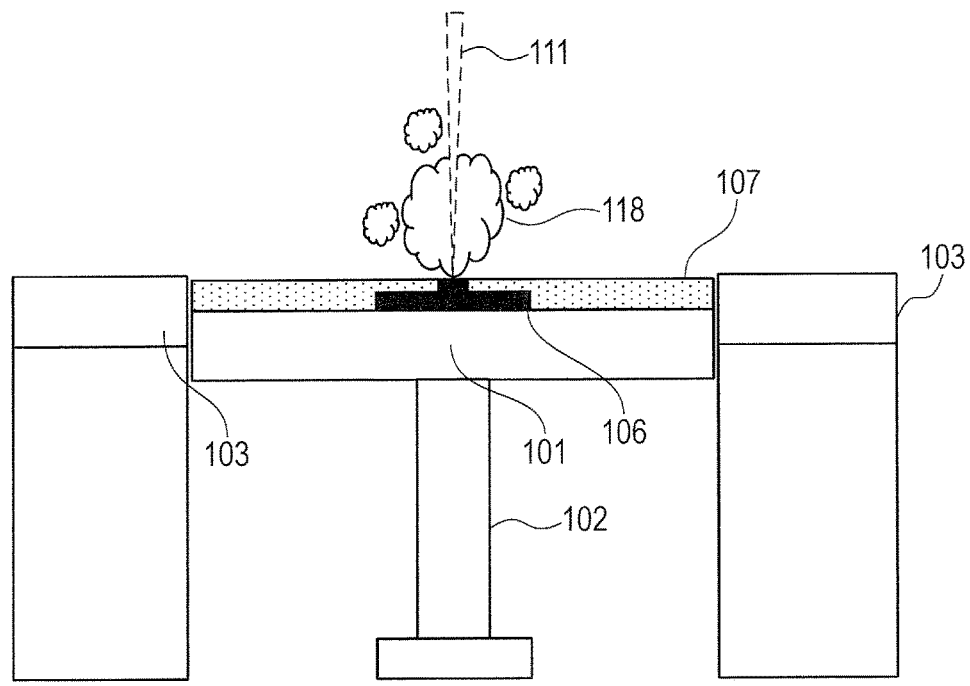
FIG. 2 is an enlarged diagram illustrating the vicinity of the modeling stage of the three-dimensional modeling apparatus of FIG. 1.

One configuration example of a three-dimensional modeling apparatus that uses a powder bed fused bonding method and can implement the present invention is described with reference to FIGS. 1 and 2. FIG. 1 illustrates a basic configuration of the three-dimensional modeling apparatus that can implement the present invention. FIG. 1 illustrates a schematic configuration that is common not only to this embodiment but also to the other embodiments described later. FIG. 2 illustrates an enlarged view around a modeling stage of the three-dimensional modeling apparatus of FIG. 1 and, in particular, illustrates an image of fumes emitted by fusing material powder during modeling.

Figure 3:
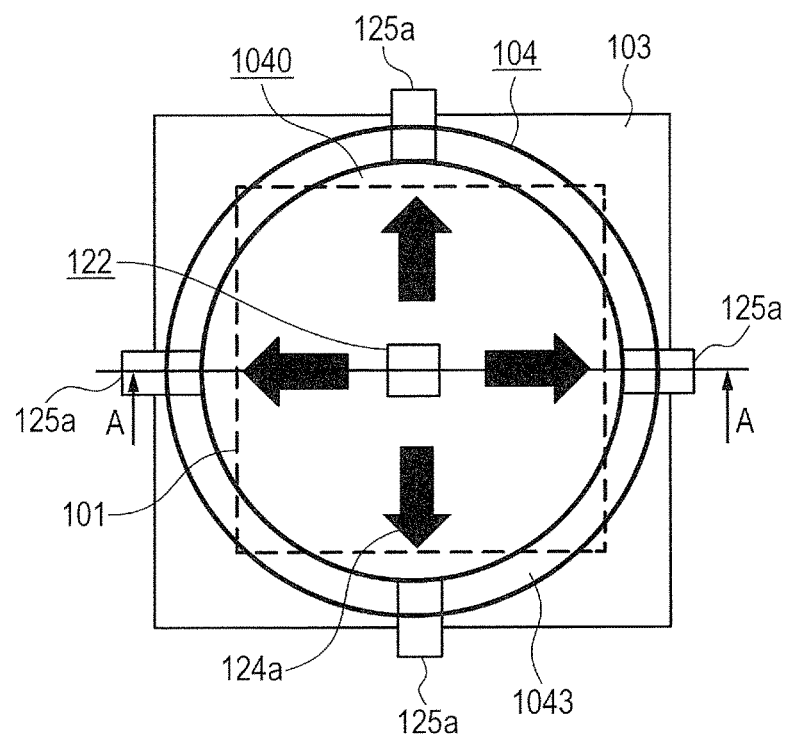
FIG. 3 is a top view illustrating a configuration example (Embodiment 1) of a cover (local cover) of the three-dimensional modeling apparatus of FIG. 1.

As illustrated in FIG. 1, this apparatus includes a modeling stage 101 for allowing a three-dimensionally shaped model body to be modeled on this stage. The modeling stage 101 can be moved up and down by a modeling table 103 so as to be gradually moved down, for example, according to the advancement of layer stacking of a model body. An up-and-down mechanism 102 of the modeling table 103 includes, for example, a drive source such as a motor, and a drive (transmission) system such as rack and pinion. This mechanism drives the modeling stage 101 to move up and down the stage according to the advancement of layer stacking of the model body by control through a controlling mechanism 120. The planar shape of the modeling stage 101 may be freely selected. For example, this shape may be a rectangle (FIG. 3 referred to later). It is a matter of course that an opening of the modeling table 103 that moves up and down the modeling stage 101 is adapted to have a shape in conformity with the modeling stage 101.

The three-dimensional modeling apparatus of FIG. 1 includes a movable powder spreading roller 105 to supply material powder that is modeling material onto the modeling stage 101 and form a powder layer 107 made of the modeling material. The position of the powder spreading roller 105 illustrated in FIG. 1 is a retracted or standby position. The powder spreading roller 105 can be moved to the right from this position by a roller drive mechanism (not illustrated in detail), supply the material powder onto the modeling stage 101, and form the powder layer 107. The material powder, which serves as the modeling material, is accommodated in a container not illustrated here. The powder is supplied to the powder spreading roller 105 in units of appropriate amounts.

This embodiment uses laser light as an energy beam with which the modeling material (powder layer) 107 on the modeling stage 101 is irradiated to solidify the material in this embodiment. A laser light source 1091 that serves as a generation source of laser light (energy beam) 111 and a laser scanning apparatus 109 that performs two-dimensional scanning with the laser light 111 are arranged outside of a chamber 110 that holds the atmosphere in the modeling environment in an appropriate case. Such arrangement of the laser light source 1091 and the laser scanning apparatus 109 outside of the chamber 110 is for avoiding the adverse effects of the atmosphere used in the chamber 110 during modeling and fumes occurring during modeling, for example.

The laser scanning apparatus 109 of this embodiment has a configuration that can perform scanning with the laser light 111 at least in two-dimensional (XY) directions on the modeling stage 101. Consequently, for example, the laser scanning apparatus 109 has a configuration that includes a scanning optical system controlled to move an irradiation spot on the modeling stage 101 in conformity with the shape of the model body. For example, the laser scanning apparatus 109 can be configured by including two Galvano mirrors.

The laser light 111 with which the laser scanning apparatus 109 performs two-dimensional scanning passes through a laser transmitting window 112 provided at the upper portion of the chamber 110, for example, immediately above the center of the modeling stage 101, and the irradiation area on the modeling stage 101 is irradiated with the laser light. The laser light 111 heats the modeling material (powder layer) 107 laid on the modeling stage 101, and fuses and solidifies the material according to the layer structure of the model body to form a solidified layer 106.

Figure 4:
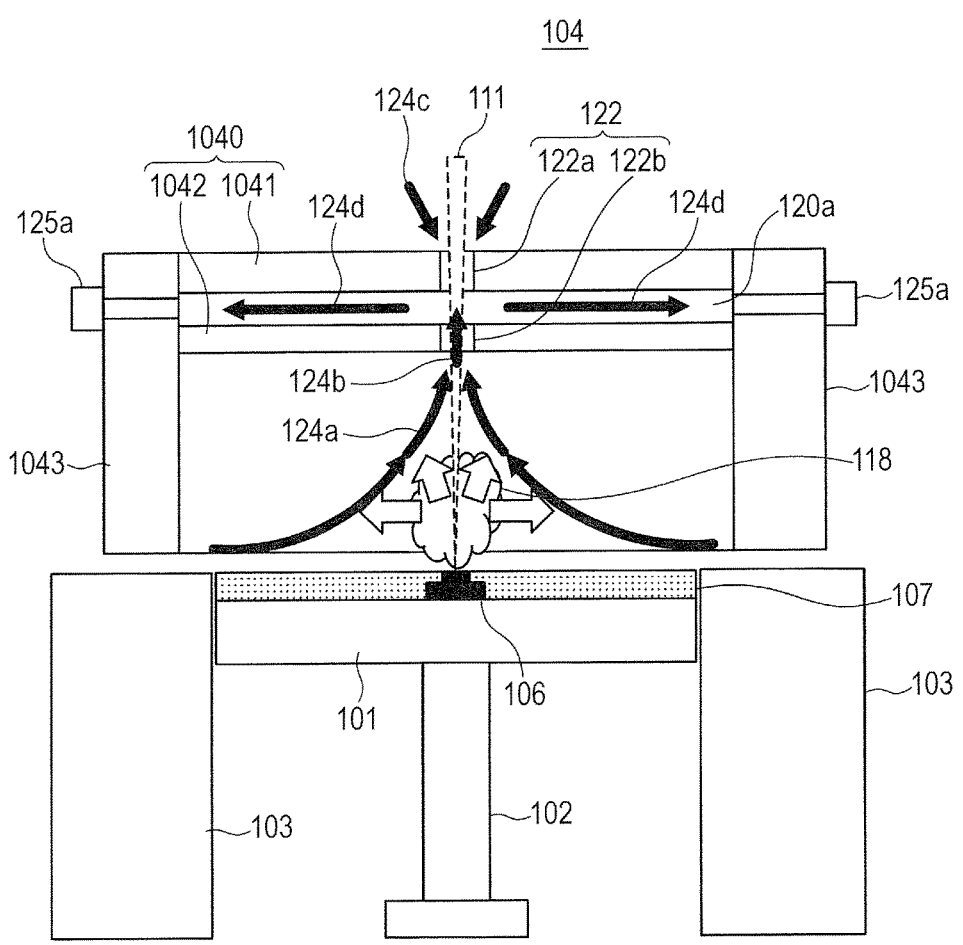
FIG. 4 is a sectional view illustrating the configuration example (Embodiment 1) of the cover (local cover) of the three-dimensional modeling apparatus of FIG. 1.

An inert gas supplying mechanism 115 is connected to the chamber 110. This mechanism supplies inert gas as an atmosphere with which the interior of the chamber 110 is filled through a supply port 113. The inert gas supplying mechanism 115 can supply the inert gas into the chamber 110 at a predetermined supply pressure. The inert gas supplying mechanism 115 has a configuration that can supply the inert gas into a cover 104 (local cover; FIGS. 3 and 4), described later, through fittings 125a (FIGS. 3 and 4) of this cover.

To collect the atmosphere (inert gas) in the chamber 110, a fume collecting mechanism 116 is arranged outside of the chamber 110. For example, the fume collecting mechanism 116 basically includes a negative pressure generator that includes an air compressor. This mechanism is connected to a collection port 114 of the chamber 110, and collects the inert gas in the chamber 110. A duct collecting box 108 can be arranged at a certain midpoint on a collection path from the chamber 110 toward the body of the fume collecting mechanism 116. The duct collecting box includes a filter or a collecting container that catches and collects fumes (the following 118) and other foreign powder emitted during modeling and collected from the inside of the chamber 110.

A collection path (fittings 125a, 125c and 125e) provided at a cover 104 (local cover), described later, is connected to the fume collecting mechanism 116 through the collection path 135c. In a case where the duct collecting box 108 is provided, the collection path 135c is connected to the duct collecting box 108. Such a configuration applies a negative pressure of the fume collecting mechanism 116 to the inside of the cover 104, and collects fumes caused in the cover 104.

The inert gas supplying mechanism 115 and the fume collecting mechanism 116 are used for pressure control to hold the state of the atmosphere in the chamber 110 and regulate the stream of the atmosphere including the fumes (118) in the cover 104, described later.

FIG. 2 illustrates an enlarged view around the modeling stage of the three-dimensional modeling apparatus of FIG. 1. The fumes 118 occur during formation of the solidified layer 106 through irradiation on the powder layer 107 on the modeling stage 101 with the laser light 111. The fumes 118 are a smoky substance (fine particles) that includes, for example, metal vapor and resin vapor (or their fine powder) depending on the characteristic of the material powder. There is a possibility that the fumes 118 diffuse the laser light 111 in an area through which the laser light 111 passes, and reduce the intensity of energy to reach the powder layer 107. There is another possibility that the fumes 118 adhere onto the laser transmitting window 112 in FIG. 1 and contaminate the window, and thus diffuse the laser light 111 and reduce the irradiation intensity.

In this embodiment, to prevent the fumes 118 (FIG. 2) caused by heating the material powder from diffusing, the laser irradiation area around the modeling stage 101 is provided with the cover 104 (local cover) that locally surrounds an area above the modeling stage 101, as illustrated in FIG. 1.

FIG. 3 illustrates the configuration of the cover 104 of this embodiment in a manner partially opened up in view from the top. FIG. 4 illustrates a sectional view taken along line A-A of FIG. 3 in the direction of the arrows. The cover 104 of this embodiment has an overall shape of a cylindrical container open at the bottom. This cover is arranged above the modeling stage 101. The overall shape of the cover 104 may be freely selected. For example, it is only required to include an upper structure 1040 that includes a laser transmitting portion, described later, (an outer partition 1041 and an inner partition 1042), and a side wall portion (side wall 1043) that surrounds the lower space. The cover 104 may have a freely selected sectional shape in a plan view, such as a circular, an oval or a rectangular shape.

The upper structure 1040 (1041 and 1042) of the cover 104 is provided with an opening 122 for allowing the laser light 111 to pass through this opening. In this embodiment, the upper structure 1040 of the cover 104 includes the outer partition 1041 and the inner partition 1042 as illustrated in FIG. 4. In this case, the opening 122 for allowing the laser light 111 to pass includes an opening 122a in the outer partition 1041 and an opening 122b in the inner partition 1042.

In this embodiment, the outer partition 1041 and the inner partition 1042 are assembled to be fitted into the top end of the side wall 1043 having a hollow cylindrical shape. The material of the cover 104 is, for example, metal or resin that is non-transparent (non-transmitting) with respect to the laser light 111. The assembly and fixing structure between the outer partition 1041 and inner partition 1042 and the side wall 1043 may be achieved by any of press-fitting, adhesion, welding, and screwing. In this embodiment, the lower portion of the cylindrical side wall 1043 is entirely open. It is however not necessarily to open the entire area of the lower portion. For example, this embodiment only requires that at least a part of the lower portion of the cylindrical side wall 1043 is open, and ventilation to the outside of the cover is secured at the part, which is also applicable to the other embodiments described later.

The irradiation area at the upper portion of the modeling stage 101, where the fumes 118 are to occur, is locally covered with the cover 104 as described above. Thus, the fumes 118 are prevented from diffusing in the chamber 110. For example, dwelling in the space where the laser light 111 passes and adhesion onto the laser transmitting window 112 can be prevented.

The cover 104 of this embodiment includes a stream regulating mechanism. This mechanism prevents the fumes 118 in the chamber 110 from diffusing, and is for reducing the adverse effect on the laser light 111 passing through the opening 122 of the cover 104. In this embodiment, the stream regulating mechanism is achieved by a gas stream path 120a formed mainly by the outer partition 1041 and the inner partition 1042, in particular, by adjusting the pressure in the gas stream path 120a.

The stream regulating mechanism regulates the fumes (gas including the fumes) so that, for example, the caused fumes can flow in a direction apart from the material powder on the modeling stage 101 and move from the opening 122 and apart in a direction toward the inside of the cover 104.

FIGS. 3 and 4 illustrate the opening 122 (122a and 122b) as a small opening having a rectangular shape (the shape may be freely selected). To prevent the fumes from leaking from the cover 104 effectively, the opening 122 (122a and 122b) has a small diameter in an appropriate case. A case can be considered where the opening diameter of the opening 122 (122a and 122b) is insufficient with respect to the scanning area of the laser light 111 required to model the solidified layer 106; however, the sufficient diameter is unnecessary for a case where the solidified layer 106 to be modeled on the modeling stage 101 is small. In the insufficient case, a moving device that moves the cover 104 may be provided to allow the laser light 111 to pass through the opening 122 according to laser scanning by the laser scanning apparatus 109. For example, the moving device may be achieved using a moving stage 126 (FIG. 1).

The moving stage 126 in FIG. 1 may be, for example, an XY (linear-moving) stage that moves the cover 104 along an XY plane to be scanned with the spot of the laser light 111. The stage corresponds to FIG. 8. Alternatively, it can be considered that the opening 122 (122a and 122b) may be a linear slit that covers one scanning direction in two-dimensional scanning with the laser light 111. In this case, there is a possibility that it is sufficient that the moving stage 126 has a configuration of only moving the cover 104 in one axis direction in the XY plane scanned with the spot of the laser light 111. The main scanning direction of scanning with the spot of the laser light 111 is not necessarily a direction parallel to the X(Y)-axis in the XY plane. Alternatively, it can be considered that this direction is inclined from the axis. To address such a case, the moving stage 126 may have a configuration that rotationally moves the cover 104.

Thus, the moving stage 126 in FIG. 1 can have the configuration that can translate in one or two axes (X and Y axes) of laser scanning or rotate about an axis (Z-axis or an axis parallel to the Z-axis) orthogonal to the XY plane. In the case where the moving stage 126 is arranged, an operation of moving the cover 104 by the moving stage 126 according to the scanning by the laser scanning apparatus 109 with the laser light 111 can be achieved by control of synchronizing both the elements by the controlling mechanism 120.

The controlling mechanism 120 can be constituted by including a CPU 121, which may be, for example, a general purpose microprocessor, ROM 123 and RAM 122. The controlling mechanism 120 applies supply control of the material powder of the powder spreading roller 105, up-and-down control of the up-and-down mechanism 102 of the modeling stage 101, turning on (and off) control of the laser light source 1091, and scanning control by the laser scanning apparatus 109, thereby controlling the operation of the entire three-dimensional modeling. According to advancement of the three-dimensional modeling operation, the inert gas supplying mechanism 115 and the fume collecting mechanism 116 are controlled.

In particular, the three-dimensional modeling operation performs irradiation with the laser light 111 through the opening 122 of the cover 104. In the case where the moving stage 126 is arranged, the controlling mechanism 120 controls the moving stage 126 to move the cover 104 so as to allow the laser light 111 to pass always through the opening 122 in synchronization with the scanning control by the laser scanning apparatus 109.

Control procedures for allowing the controlling mechanism 120 to control the three-dimensional modeling operation that includes control of moving (scanning) the cover 104 can be stored as a control program executed by the CPU 121, for example, in the ROM 123. The CPU 121 uses the RAM 122 as a work area when executing the control program. When the control program is recorded (stored) in the ROM 123 (or external storing devices, such as various types of flash memories and HDD, not illustrated), these recording media constitute a computer-readable recording medium that stores control procedures for executing the present invention. A program for executing control procedures, described later, may be stored in a fixed recording medium, such as ROM or HDD. Alternatively, the program may be stored in a detachable computer-readable recording medium, such as various flash memories or an optical (magnetic) disk. Such a storing scheme can be used for a case of installing or updating the control program for executing the control procedures of the present invention. When the program for executing the control procedures of the present invention is installed or updated, the detachable recording medium as described above may be used. Alternatively, a scheme of downloading the program via a network (intranet), not illustrated, may be used.

Furthermore, a display unit 124 that includes a liquid crystal display, and an operating unit 117 that includes a keyboard (and additionally a pointing device, such as a mouse) can be connected to the controlling mechanism 120. The display unit 124 can be used to display advancement of the three-dimensional modeling operation and control parameters for setting. The operating unit 117 issues instructions of activation and (temporary) stopping of the three-dimensional modeling operation, and is used to input the control parameters for setting.

Hereinafter, referring to FIGS. 3 and 4, the configuration and operation of the cover 104 of this embodiment are described in detail. As described above, the cover 104 includes the upper structure 1040 made up of the outer partition 1041 and the inner partition 1042.

At the centers of the outer partition 1041 and the inner partition 1042, the openings 122a and 122b are provided, respectively. The openings 122a and 122b constitute an energy beam transmitting portion that has air permeability and allows the laser light 111 to be transmitted (to pass) at the center of the upper structure 1040.

The outer partition 1041 and the inner partition 1042 are supported, apart from each other, by the side wall 1043 having a hollow cylindrical shape so as to form its ceiling, for example. The space between the outer partition 1041 and the inner partition 1042 constitutes the gas stream path 120a.

As illustrated in FIG. 3, the side wall 1043 that constitutes the lower structure of the cover 104 has a configuration having a size (diameter) of substantially covering the modeling stage 101 at the center of the modeling table 103. The cover 104 is supported by a support member, not illustrated, (or moving stage 126) so that the lower edge portion of the side wall 1043 is apart slightly (for example, by about several to several tens of millimeters) from the modeling table 103.

The inside of the gas stream path 120a is connected to and communicates with the collection path 135c (FIG. 1) of the fume collecting mechanism 116 through the fittings 125a, which serve as gas communicating paths. As illustrated in FIG. 3, the fittings 125a serving as the gas communicating paths are arranged at multiple positions with respect to the gas stream path 120a having a circular section. In this example, four fittings 125a are arranged so as to divide the outer periphery of the gas stream path 120a by 90° into four sections.

Prior to the modeling operation, the controlling mechanism 120 (CPU 121) causes the inert gas supplying mechanism 115 to fill the chamber 110 with inert gas at a predetermined concentration or a predetermined pressure. Subsequently, the controlling mechanism 120 (CPU 121) models the solidified layer 106 on a layer-by-layer basis based on three-dimensional modeling data that represents an intended model body and has been input from an external apparatus. That is, one layer of the powder layer 107 is laid on the modeling stage 101 by the powder spreading roller 105. Subsequently, the controlling mechanism 120 (CPU 121) causes the laser light source 1091 to irradiate the laid powder layer 107 with the laser light 111 on a layer-by-layer basis from the bottom layer so as to solidify a spot operation range in the three-dimensional modeling data corresponding to the modeled layer.

The controlling mechanism 120 (CPU 121) applies a negative pressure (e.g., a pressure lower than the pressure in the chamber 110) from the fume collecting mechanism 116 through the multiple fittings (gas communicating paths) 125a during modeling by irradiating the powder layer 107 on the modeling stage 101 with the laser light 111. This application regulates the flow of the gas constituting the atmosphere into the directions indicated by the arrows (124a to 124d) in FIG. 4 inside and outside of the cover 104. That is, application of the suction negative pressure of the fume collecting mechanism 116 through the fittings 125a sucks the gas from the openings 122a and 122b toward the inside of the gas stream path 120a as indicated by the arrows (124b and 124c).

Thus, in the cover 104, the flow of the gas is regulated from the lower edge portion of the periphery of the cover 104 toward the opening 122b at the upper central portion as indicated as the arrows (124a and 124c). The gas that contains the fumes 118 caused at the portion of the powder layer 107 on the modeling stage 101 irradiated with the laser light 111 moves upward so as to be apart upward from the irradiated portion and is sucked toward the opening 122b of the inner partition 1042.

Furthermore, the gas that contains the fumes 118 flows in the gas stream path 120a as indicated by the arrows (124d, 124d, . . . ) in FIGS. 3 and 4, and is collected into the duct collecting box 108 of the fume collecting mechanism 116. In this embodiment, there is not any site to which a collection negative pressure is applied from the fume collecting mechanism 116 other than the four fittings 125a. Consequently, the atmosphere outside of the cover 104, that is, in the chamber 110, is supplied as indicated by the arrows (124a and 124c) from the upper portion and the lower edge portion of the cover 104 so as to compensate the amount sucked to the fume collecting mechanism 116.

As described above, the cover 104 of this embodiment includes the outer partition 1041 and the inner partition 1042, and further includes the upper structure 1040 that forms the gas stream path 120a. The negative pressure is applied from the fittings 125a into the gas stream path 120a. Thus, in particular, in the cover 104, the stream regulating mechanism is configured that regulates the gas that contains the fumes 118 in the directions as indicated by the arrows (124a to 124d) in FIG. 4 so as not to leak to the outside.

This configuration can effectively suppress the flow of the gas containing the fumes 118 caused by irradiation with the laser light 111 to the outside of the cover 104 through the opening 122 (122a and 122b) and the lower edge portion of the cover 104. According to this embodiment, the cover 104 that includes the stream regulating mechanism as described above can effectively prevent diffusion of the fumes which are to occur around the modeling stage 101 accompanying irradiation with an energy beam (laser light 111). In particular, the stream regulating mechanism as described above can regulate the gas containing the fumes 118 so as to be apart upward in the cover 104, remove the fumes from the irradiated portion, and suppress diffusion of the fumes from a position lower than the cover.

That is, this embodiment can cover the modeling site on the modeling stage 101 with the cover 104, and effectively suppress the flow of the fumes 118 (gas containing the fumes) out of the cover 104. Thus, reduction in irradiation intensity due to adhesion of the fumes 118 onto the laser transmitting window 112 of the chamber 110 and dwelling of the fumes 118 on the optical path of the laser light 111 can be effectively suppressed. Furthermore, the fumes 118 can be prevented from adhering onto the components in the chamber 110. For example, adverse effects of the fumes on electric configuration elements, movable portions and slidable portions can be effectively suppressed.

Embodiment 2

The above Embodiment 1 describes one example of the cover 104 that includes the outer partition 1041 and the inner partition 1042, and further includes the upper structure 1040 that forms the gas stream path 120a. The above Embodiment 1 describes the example that regulates the atmosphere containing the fumes (118) by controlling the pressure in the gas stream path 120a of the cover 104 to be negative using the four fittings 125a, and prevents the atmosphere from leaking to the outside of the cover 104.

However, to achieve the same object, the configuration of the gas stream path (120c in this embodiment), and the mode of pressure control and stream regulating in the gas stream path (120c) can be changed as described below, for example.

Figure 5:
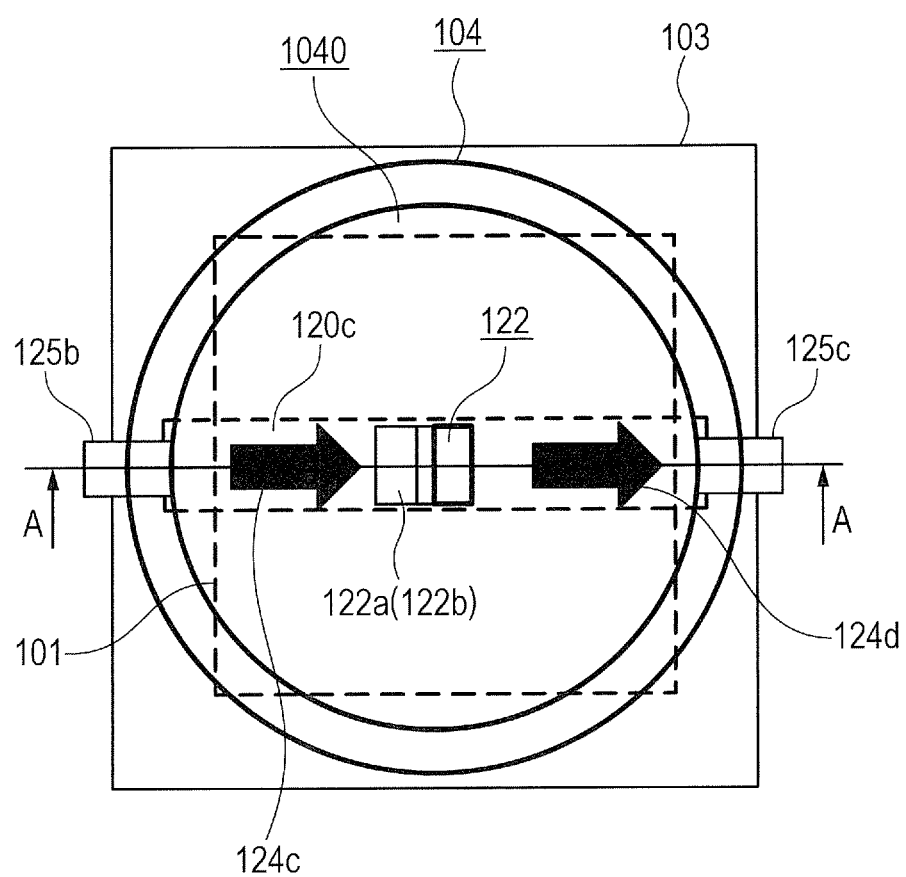
FIG. 5 is a top view illustrating a configuration example (Embodiment 2) of a cover (local cover) of the three-dimensional modeling apparatus of FIG. 1.
Figure 6:
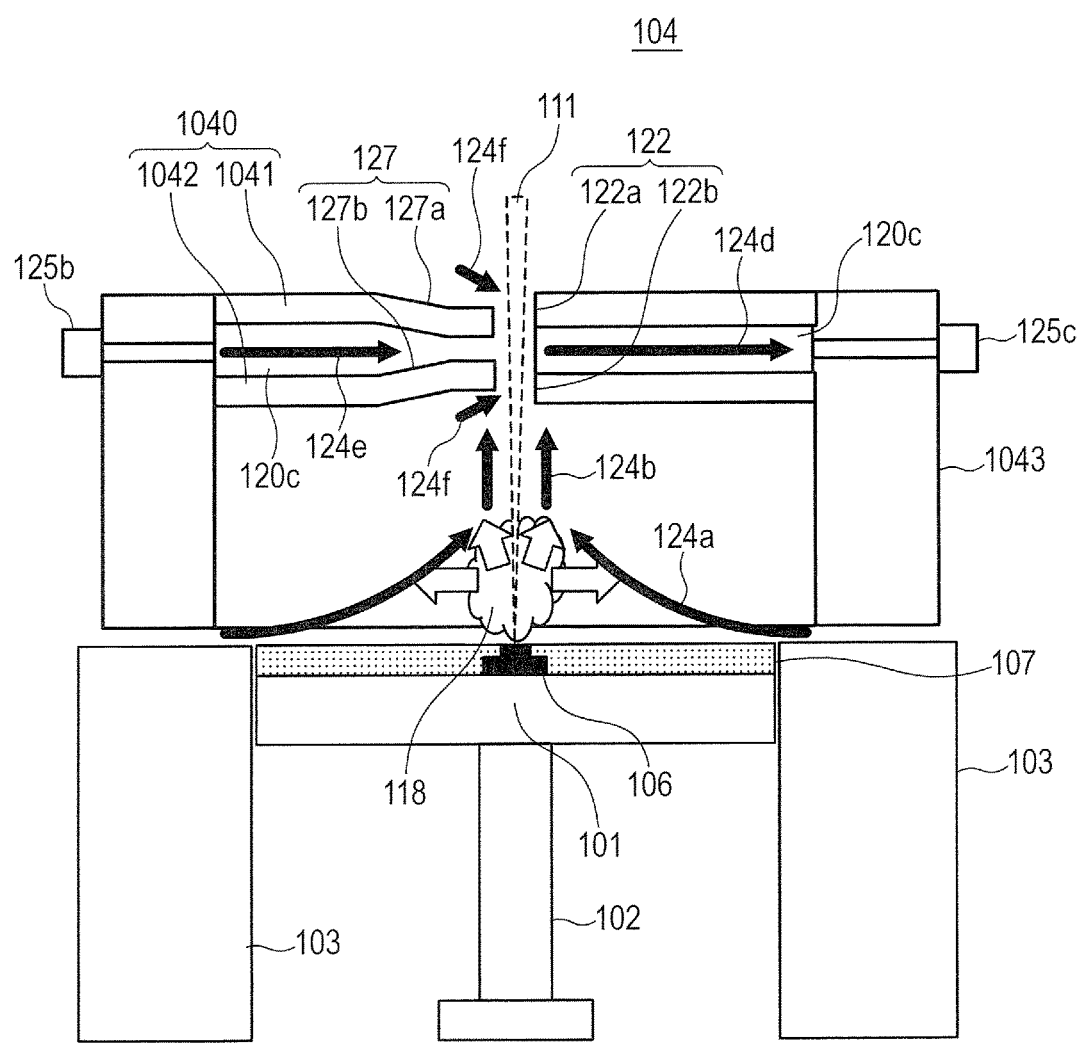
FIG. 6 is a sectional view illustrating the configuration example (Embodiment 2) of the cover (local cover) of the three-dimensional modeling apparatus of FIG. 1.

FIGS. 5 and 6 illustrate the configuration and operation of the cover 104 of this Embodiment 2. The illustrated mode is the same as that of FIGS. 3 and 4. In FIGS. 5 and 6, the same or similar members are assigned the same reference signs as those assigned to the corresponding members in the above embodiments. The detailed description of the members which are not specifically required is omitted. The entire configuration of the modeling apparatus and the occurring mode of the fumes 118 other than those illustrated in FIGS. 5 and 6 are analogous to those in FIGS. 1 and 2.

In FIGS. 5 and 6, the cover 104 includes the side wall 1043 that has a hollow cylindrical shape, and the upper structure 1040, as with the above description. The fact that the upper structure 1040 includes the outer partition 1041 and the inner partition 1042 is also analogous to that in the above description.

This embodiment has a different configuration around the opening 122 of the upper structure 1040, that is, the openings 122a and 122b of the outer partition 1041 and the inner partition 1042. To the gas stream path 120c formed between the outer partition 1041 and the inner partition 1042, the fittings 125b and 125c serving as a first gas communicating path and a second gas communicating path are connected. The functions are different from those in Embodiment 1. Among these fittings, the fitting 125b (first gas communicating path) is a fitting for supplying inert gas, and the fitting 125c (second gas communicating path) is a fitting for collecting gas (inert gas) that contains fumes by the negative pressure of the fume collecting mechanism 116.

The fitting 125c communicates with the collection path 135c (FIG. 1) of the fume collecting mechanism 116. The fitting 125b communicates with the inert gas supply path of the inert gas supplying mechanism 115 (FIG. 1). The supply pressure is equivalent to the pressure of the atmosphere in the chamber 110 or a pressure higher than this pressure, for example. Thus, the negative pressure applied mainly through the fitting 125*c* regulates the gas stream in the gas stream path 120*c* in one direction from the fitting 125*b* to the fitting 125*c* as indicated by the arrows (124*e* to 124*d*).

In this embodiment, only the two fittings 125*b* and 125*c* are arranged. The gas stream path 120*c* is formed only in a range from the fitting 125*b* to the fitting 125*c* as indicated by the broken lines in FIG. 5, and no opening is formed at the other sites in an appropriate case.

In this embodiment, as illustrated in FIGS. 5 and 6, the openings 122*a* and 122*b* of the outer partition 1041 and the inner partition 1042, which form the gas stream path 120*c*, are rectangular penetration openings. In this embodiment, the gas is regulated in the gas stream path 120*c* as indicated by the arrows (124*e* to 124*d*).

Furthermore, step portions 127*a* and 127*b* as illustrated in FIGS. 5 and 6 are formed at the outer partition 1041 and the inner partition 1042, respectively. These step portions 127*a* and 127*b* increase the flow velocity of the gas at a site upstream of the openings 122*a* and 122*b* (energy beam transmitting portion), and form a narrow path 127 that causes a negative pressure at the upstream side portion. Thus, the gas stream path 120*c* facing the openings 122*a* and 122*b* has a smaller opening sectional area on the upstream side of the openings 122*a* and 122*b* than the downstream side of the openings 122*a* and 122*b*. Such a configuration regulates the inert gas (arrow (124*e*)), which has been supplied from the fitting 125*b* and is moving toward the portions at the openings 122*a* and 122*b*, to be a gas stream having a high flow velocity (and being a narrow flow) at the narrow path 127. The stream blows into the opening of the gas stream path 120*c* facing the downstream side of the openings 122*a* and 122*b*.

As indicated by arrows (124*f* and 124*f*), at the upper and lower portions of the outer partition 1041 and the inner partition 1042, a gas stream occurs that is blowing from the openings 122*a* and 122*b* into the downstream-side opening of the gas stream path 120*c*. This stream is caused because the gas stream passing through the portions at the openings 122*a* and 122*b* is regulated to be a stream having a high flow velocity at the narrow path 127. That is, at both the upper and lower ends of the narrow path 127, a negative pressure toward the center of the narrow path 127 is caused (Venturi effect). Resultantly, as indicated by arrows (124*f* and 124*f*), at the upper and lower portions of the outer partition 1041 and the inner partition 1042, the gas stream is regulated to blow into the downstream-side opening of the gas stream path 120*c*.

The gas flow in the cover 104 is analogous to that in Embodiment 1 described above, as indicated by the arrows (124*a* and 124*b*). That is, the flow of the gas is regulated from the lower edge portion of the periphery of the cover 104 toward the opening 122*b* at the upper central portion as indicated as the arrows (124*a* and 124*c*). The gas that contains the fumes 118 caused at the portion of the powder layer 107 on the modeling stage 101 irradiated with the laser light 111 moves upward so as to be apart upward from the irradiated portion and is sucked toward the opening 122*b* of the inner partition 1042.

According to the configuration described above, the stream regulating mechanism that regulates the gas stream in the directions as indicated by the arrows (124*a*, 124*b*, 124*d* and 124*e*) in FIG. 4 can be configured in the cover 104.

Also in this embodiment, this configuration can effectively suppress the flow of the gas containing the fumes 118 caused by irradiation with the laser light 111 to the outside of the cover 104 through the opening 122 (122*a* and 122*b*) and the lower edge portion of the cover 104. According to this embodiment, the cover 104 that includes the stream regulating mechanism as described above can effectively prevent diffusion of the fumes caused around the modeling stage 101 accompanying irradiation with the energy beam (laser light 111). In particular, the stream regulating mechanism as described above can regulate the stream of the gas containing the fumes 118 so as to be apart upward in the cover 104, remove the fumes from the irradiated portion, and suppress diffusion of the fumes from a position lower than the cover.

That is, this embodiment can cover the modeling site on the modeling stage 101 with the cover 104, and effectively suppress the flow of the fumes 118 (gas containing the fumes) out of the cover 104. Thus, reduction in irradiation intensity due to adhesion of the fumes 118 onto the laser transmitting window 112 of the chamber 110 and dwelling of the fumes 118 on the optical path of the laser light 111 can be effectively suppressed. Furthermore, the fumes 118 can be prevented from adhering onto the components in the chamber 110. For example, adverse effects of the fumes on electric configuration elements, movable portions and slidable portions can be effectively suppressed. There is a possibility that if increase in inert gas supply pressure from the fitting 125*b* increases the velocity of the stream blowing from the narrow path 127, the opening areas of the openings 122*a* and 122*b* can be increased. Thus, depending on the size of the area of scanning with the laser on the modeling stage 101, there is a possibility of negating the need of the moving stage 126 for moving the cover 104.

Embodiment 3

Figure 7:
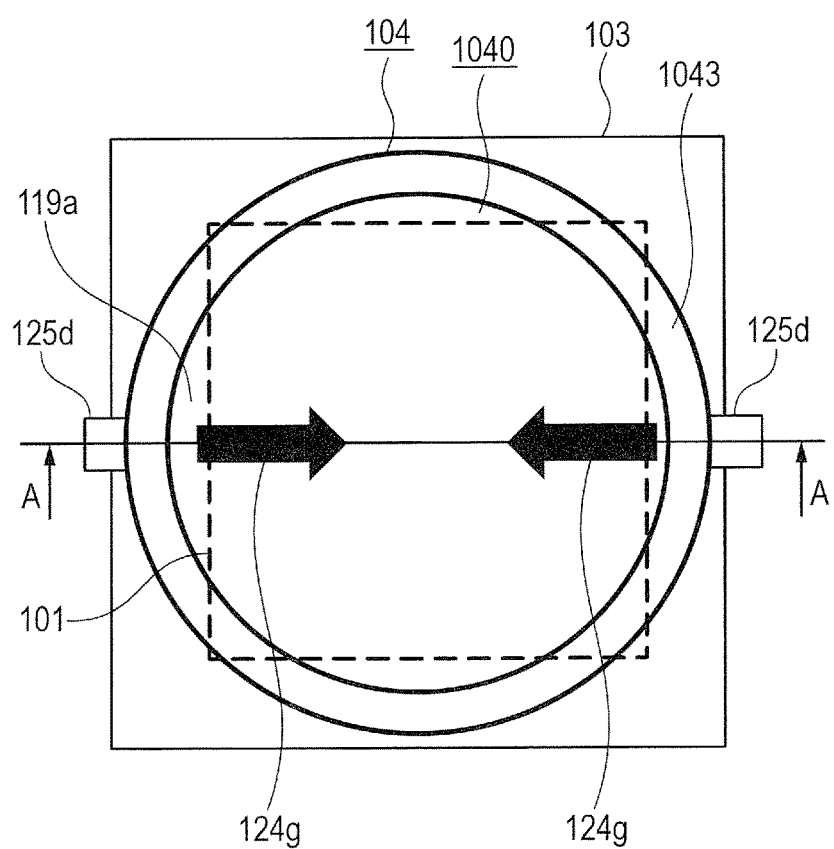
FIG. 7 is a top view illustrating a configuration example (Embodiment 3) of a cover (local cover) of the three-dimensional modeling apparatus of FIG. 1.
Figure 8:
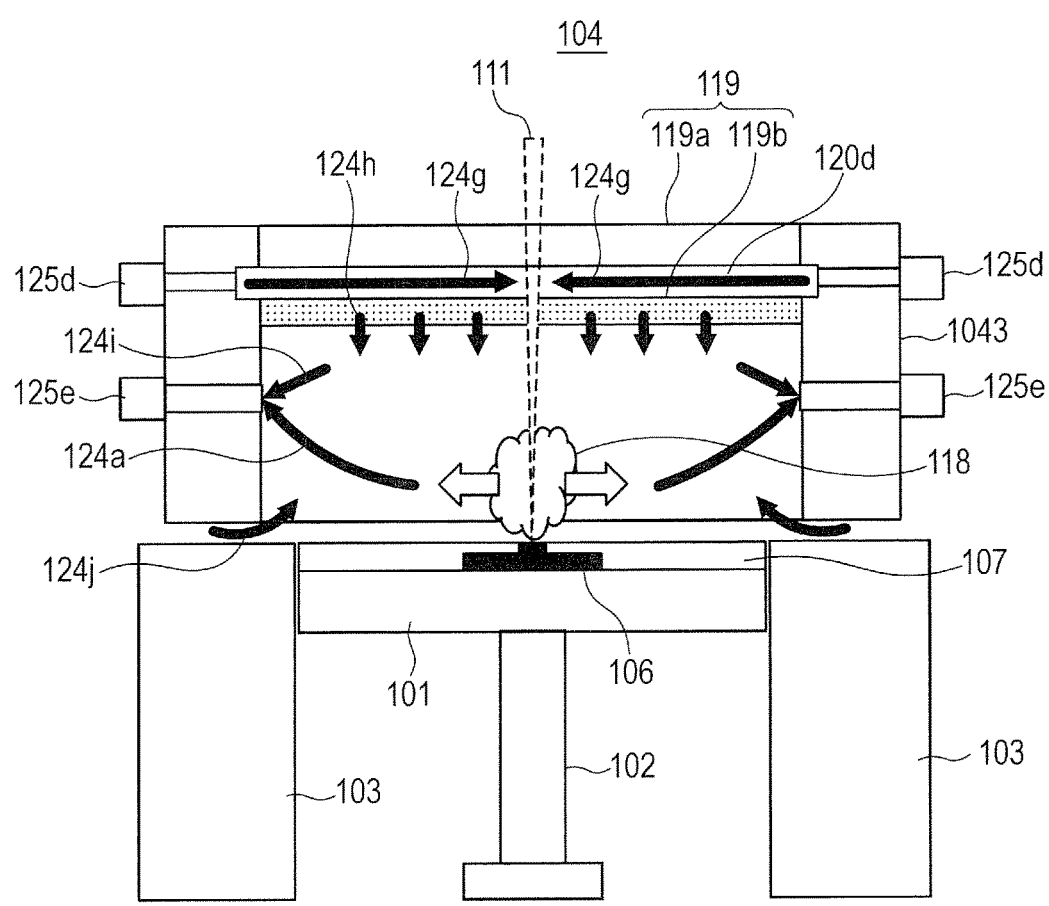
FIG. 8 is a sectional view illustrating the configuration example (Embodiment 3) of the cover (local cover) of the three-dimensional modeling apparatus of FIG. 1.

FIGS. 7 and 8 illustrate the configuration of a cover 104 in this embodiment in a manner equivalent to that in FIGS. 3 and 4 (FIGS. 5 and 6).

In Embodiments 1 and 2 described above, the gas stream path 120*a* or gas stream path 120*c* of the cover 104 communicates with the fitting 125*a* or the fitting 125*c* that serves as a gas communicating path for exhausting gas from the inside. The openings 122*a* and 122*b* (permeation holes) are formed in the outer partition 1041 and the inner partition 1042, respectively, that forms the gas stream path 120*a* and the gas stream path 120*c*, to allow the laser light 111 to be transmitted (pass).

Unlike these configurations, Embodiment 3 concerned, as illustrated in FIG. 8, the upper structure 119 of the cover 104 is not provided with any opening through the outer partition 119*a* and the inner partition 119*b* that form the gas stream path 120*d*.

In this Embodiment 3, the outer partition 119*a* that forms the gas stream path 120*d* is made of transparent material (e.g., glass material, such as optical glass) that allows the laser light 111 to pass through this material and has airtightness, and is provided with no permeation hole (penetration hole). Meanwhile, the inner partition 119*b* that forms the gas stream path 120*d* is made of porous glass material that has air permeability and permeability with the laser light 111. The porous glass material used for the inner partition 119*b* may have any composition that has the diameters of pores about 20 nm or less. In the case of porous glass, it is known that the glass having the diameters of pores less than 20 nm has a sufficiently high light transmittance (http://www.newglass.jp/mag/TITL/maghtml/88-pdf/+88-p003.pdf). In a case where the inner partition 119*b* in FIGS. 7 and 8 is made of the porous glass material as described above, it can be considered that the entire inner partition 119*b* constitutes the laser transmitting opening (the opening 122*b* described above).

Also in this embodiment, the gas stream path 120*d* formed by the outer partition 119*a* and the inner partition 119*b*, and the fittings 125*d* and 125*e* connected to the cover 104 regulate the stream of the gas in the cover 104. In the configuration of FIG. 8, among the fittings, the fittings 125*d* (, 125*d* . . . ) are open facing the gas stream path 120*d*. The fittings 125*e* (, 125*e* . . . ) are open at positions higher than the position of the lower edge of the side wall 1043 of the cover 104 (the area irradiated with the laser light 111 (the site where the fumes 118 occur)).

In this embodiment, the fittings 125*d* (, 125*d* . . . ) are connected to the inert gas supplying mechanism 115 and are used to supply gas into the gas stream path 120*d*. The fittings 125*e* (, 125*e* . . . ) are connected to the fume collecting mechanism 116, apply the negative pressure of the fume collecting mechanism 116 through the fittings 125*e* (, 125*e* . . . ), and are used to exhaust the gas from the inside of the cover 104. According to such pressure setting, in this embodiment, the stream of the atmospheric gas is regulated in the directions of the arrows (124*a*, 124*g*, 124*h*, 124*i* and 124*j*) in the cover 104.

In particular, as to the upper and lower sides of the inner partition 119*b* made of the porous glass, a positive pressure is applied onto the gas stream path 120*d* side while a negative pressure is applied onto the lower side of the inner partition 119*b*. Thus, the inert gas supplied from the inert gas supplying mechanism 115 is then supplied from the gas stream path 120*d* in the downward direction of the inner partition 119*b* through the pores on the entire surface of the inner partition 119*b*, as indicated by the arrow (124*h*). The gas that has occurred at the portion irradiated with the laser light 111 and contains fumes 118 is regulated by the negative pressure of the fume collecting mechanism 116 applied through the fitting 125*e* so as to be apart upward from the irradiated portion (arrow (124*a*)). To compensate the amount of exhausted through the fitting 125*e*, the atmosphere (e.g., inert gas) in the chamber 110 is supplied from the gap at the lower edge of the side wall 1043 to the inner side of the lower portion of the cover 104 (arrow (124*j*)).

Also in this Embodiment 3, the above configuration can effectively suppress the flow of the gas including the fumes 118 caused by irradiation with the laser light 111 to the outside of the cover 104. According to this embodiment, the cover 104 that includes the stream regulating mechanism as described above can effectively prevent diffusion of the fumes caused around the modeling stage 101 accompanying irradiation with the energy beam (laser light 111). In particular, the stream regulating mechanism as described above can regulate the stream of the gas containing the fumes 118 so as to be apart upward in the cover 104, remove the fumes from the irradiated portion, and suppress diffusion of the fumes from a position lower than the cover.

That is, this embodiment can cover the modeling site on the modeling stage 101 with the cover 104, and effectively suppress the flow of the fumes 118 (gas containing the fumes) out of the cover 104. Thus, reduction in irradiation intensity due to adhesion of the fumes 118 onto the laser transmitting window 112 of the chamber 110 and dwelling of the fumes 118 on the optical path of the laser light 111 can be effectively suppressed. Furthermore, the fumes 118 can be prevented from adhering onto the components in the chamber 110. For example, adverse effects of the fumes on electric configuration elements, movable portions and slidable portions can be effectively suppressed.

The configuration in FIGS. 7 and 8 can use the entire surfaces of the outer partition 119*a* and the inner partition 119*b* as the energy beam (laser light 111) transmitting portion. Consequently, the entire size of the cover 104 secured to cover the entire modeling stage 101 causes a possibility of negating the need of the moving device, such as the moving stage 126, even in a case where the intended model body has a large size.

It is possibly considered that the structure in FIG. 8 does not adopt the fitting 125*e* (, 125*e* . . . ) and instead regulates the stream of the gas in the cover 104 through the fitting 125*d* (, 125*d* . . . ) that is open facing the gas stream path 120*d*. In this case, the directions of the arrows (124*g* and 124*h*) are inverted from those illustrated in FIG. 8. The gas in the inner side of the lower portion of the cover 104 flows so as to be supplied through the pores on the entire surface of the inner partition 119*b*. This configuration can also collect the gas itself that has occurred at the portion irradiated with the laser light 111 and contains the fumes 118. However, in this case, the fumes 118 flow through the pores in the porous glass of the inner partition 119*b*. In this case, there is a possibility that the fumes adhere onto the surface of the porous glass and the pores are clogged with the fumes to reduce the permeability of the inner partition 119*b* with the laser light 111 (energy beam).

Meanwhile, the arrangement of the supply and exhaust directions of this Embodiment 3 illustrated in FIG. 8 does not allow the gas containing the fumes 118 to pass through the pores in the porous glass of the inner partition 119*b*. That is, the configuration of this Embodiment 3 has an advantage that the fumes 118 do not affect the inside of the gas stream path 120*d* and the pores in the porous glass of the inner partition 119*b*.

Embodiment 4

Figure 9:
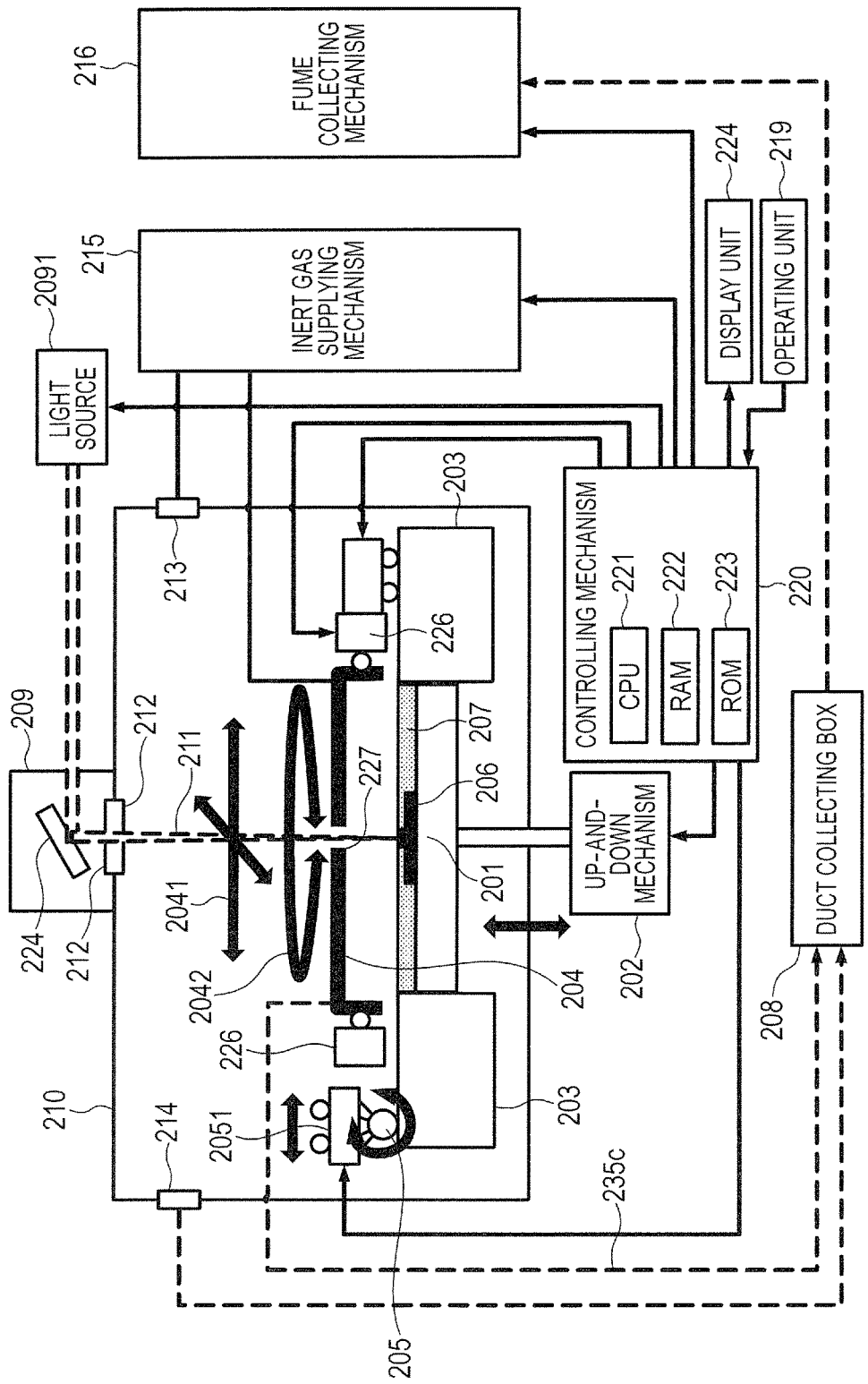
FIG. 9 is a diagram illustrating a configuration of a three-dimensional modeling apparatus that can implement Embodiments 4 to 8 which are embodiments of the present invention.
Figure 10:
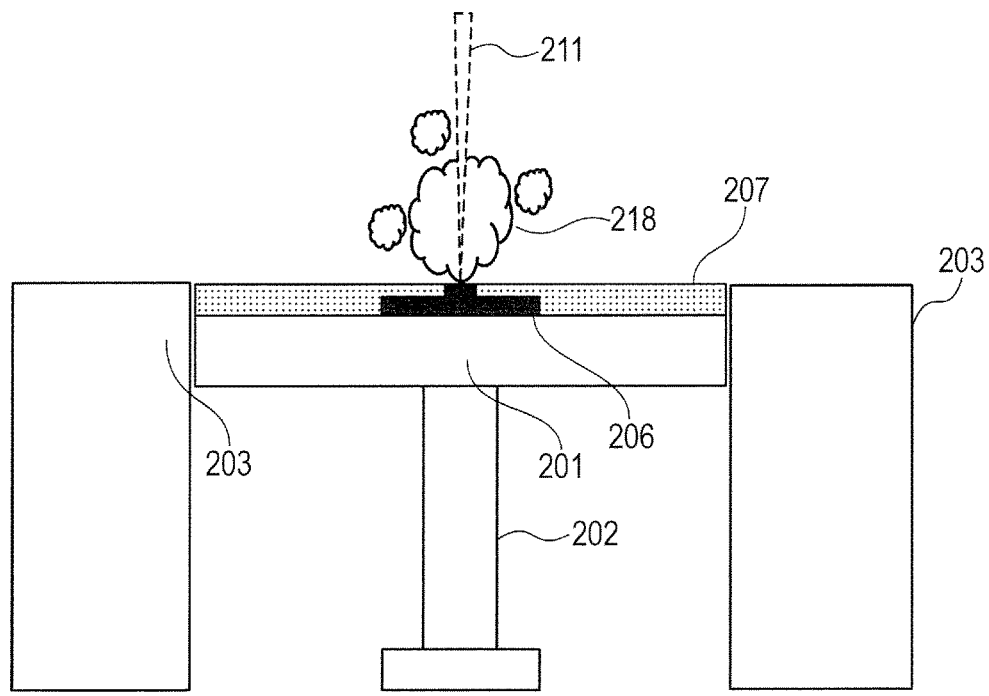
FIG. 10 is an enlarged diagram illustrating the vicinity of the modeling stage of the three-dimensional modeling apparatus of FIG. 9.

One configuration example of a three-dimensional modeling apparatus that uses a powder bed fused bonding method and can implement the present invention is described with reference to FIGS. 9 and 10. FIG. 9 illustrates a basic configuration of the three-dimensional modeling apparatus of the three-dimensional modeling apparatus that can implement the present invention. FIG. 9 illustrates a schematic configuration that is common not only to this embodiment but also to the other embodiments described later. FIG. 10 illustrates an enlarged view around a modeling stage of the three-dimensional modeling apparatus of FIG. 9 and, in particular, illustrates an image of fumes emitted by fusing material powder during modeling.

As illustrated in FIG. 9, this apparatus includes a modeling stage 201 where the three-dimensionally shaped model body is modeled. The modeling stage 201 can be moved up and down by a modeling table 203 so as to be gradually moved down, for example, according to the advancement of layer stacking of the model body. An up-and-down mechanism 202 of the modeling table 203 includes, for example, a drive source such as a motor, and a drive system such as rack and pinion. This mechanism drives the modeling stage 201 to move up and down the stage according to the advancement of layer stacking of the model body by control through a controlling mechanism 220.

The three-dimensional modeling apparatus of FIG. 9 includes a movable powder spreading roller 205 to supply material powder as the modeling material onto the modeling stage 201 and form a powder layer 207. The illustrated position of the powder spreading roller 205 is the retracted or standby position. The powder spreading roller 205 can be moved by the roller drive mechanism 2051 from this position to a site above the modeling stage 201, and supplies the material powder to form the powder layer 207. The material powder, which serves as the modeling material, is accommodated in a container not illustrated. The powder is supplied to the powder spreading roller 205 in units of appropriate amounts, for example.

This embodiment uses laser light as an energy beam with which the modeling material (powder layer) 207 on the modeling stage 201 is irradiated in this embodiment. A laser light source 2091 that serves as a generation source of laser light 211 and a laser scanning apparatus 209 that performs two-dimensional scanning with the laser light 211 are arranged outside of a chamber 210 that holds the atmosphere in the modeling environment so as to avoid the adverse effect of the fumes occurring during modeling, for example.

The laser scanning apparatus 209 of this embodiment has a configuration that can perform scanning with the laser light 211 at least in a two dimensional (XY) direction on the modeling stage 201. Thus, for example, the laser scanning apparatus 209 has a configuration having two Galvano mirrors controlled in conformity with the shape of the model body. The laser light 211 with which the laser scanning apparatus 209 performs two-dimensional scanning passes through a laser transmitting window 212 provided at the upper portion of the chamber 210, for example, immediately above the center of the modeling stage 201, and the irradiation area on the modeling stage 201 is irradiated with the laser light. The laser light 211 heats the modeling material (powder layer) 207 laid on the modeling stage 201, and fuses and solidifies the material according to the layer structure of the model body to form a solidified layer 206.

Figure 11:
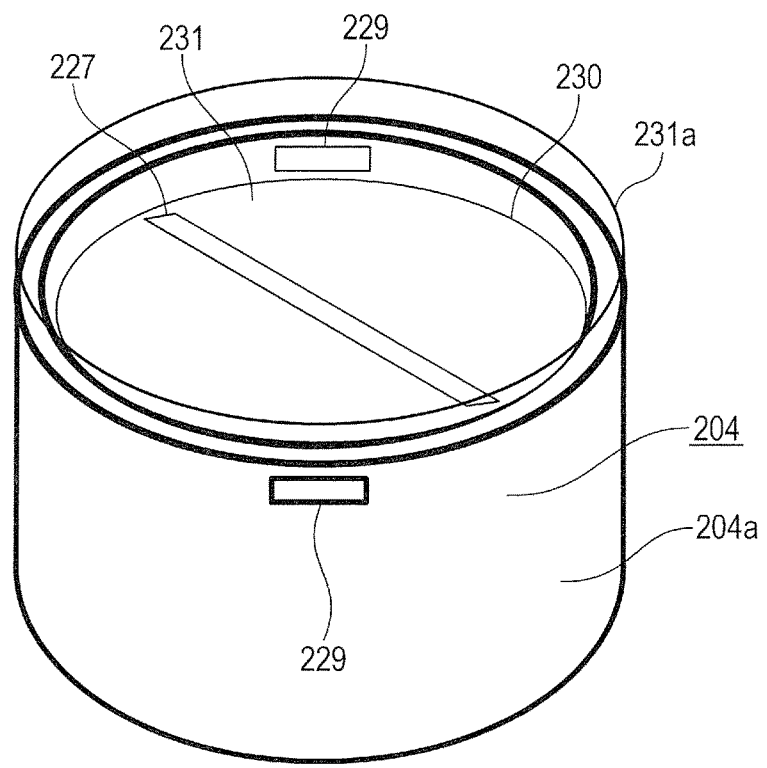
FIG. 11 is a perspective view illustrating a configuration example (Embodiment 4) of a cover (local cover) of the three-dimensional modeling apparatus of FIG. 9.

An inert gas supplying mechanism 215 is connected to the chamber 210. This mechanism supplies inert gas as an atmosphere with which the interior of the chamber 210 is filled through a supply port 213. The inert gas supplying mechanism 215 has a configuration that can supply inert gas into the chamber 210 and through fittings 233 (FIG. 12) at a predetermined supply pressure. The inert gas supplying mechanism 215 supplies the inert gas at the predetermined supply pressure through openings 229 of a cover 204 (local cover: FIG. 11), described later, into the cover 204.

To collect the fumes (218 described later) that have been emitted during modeling and are contained in the collected inert gas and, a fume collecting mechanism 216 is arranged outside of the chamber 210. The fume collecting mechanism 216 basically includes a negative pressure generator that includes an air compressor. This mechanism is connected to a collection port 214 of the chamber 210, and collects the inert gas in the chamber 210.

A duct collecting box 208 can be arranged at a certain midpoint on a collection path from the chamber 210 toward the body of the fume collecting mechanism 216. The duct collecting box 208 may be a filter or a collecting container that catches and collects the fumes and other foreign powder.

A collection path (235a) provided at the cover 204 (local cover), described later, is connected to the duct collecting box 208 through a collection path 235c. Such a configuration applies the negative pressure of the fume collecting mechanism 216 to the collection path 235a of the cover 204, and collects fumes caused in the cover 204 into the duct collecting box 208.

The inert gas supplying mechanism 215 and the fume collecting mechanism 216 are used for pressure control to hold the state of the atmosphere in the chamber 210 and regulate the stream of the atmosphere containing the fumes (218) in the cover 204, described later.

FIG. 10 illustrates an enlarged view around the modeling stage of the three-dimensional modeling apparatus of FIG. 9. The fumes 218 occurs during formation of the solidified layer 206 through irradiation on the powder layer 207 on the modeling stage 201 with the laser light 211. The fumes 218 are a smoky substance that includes, for example, metal vapor and resin vapor (or their fine powder) depending on the characteristic of the material powder. There is a possibility that the fumes 218 diffuse the laser light 211 in an area through which the laser light 211 passes, and reduce the intensity of energy to reach the powder layer 207. There is another possibility that the fumes 218 adhere onto the laser transmitting window 212 in FIG. 9 and contaminate the window, and thus diffuse the laser light 211 and reduce the irradiation intensity.

In this embodiment, to prevent the fumes 218 (FIG. 10) caused by heating from diffusing, the laser irradiation area around the modeling stage 201 is provided with the cover 204 (local cover) that locally covers the upper portion of the modeling stage 201, as illustrated in FIG. 9. The cover 204 of this embodiment has an overall shape of a cylindrical container open at the bottom. This cover is arranged on the modeling stage 201. The upper portion of the cover 204 is provided with an opening 227 for allowing the laser light 211 to pass through this opening. In this embodiment, an example is described where the opening 227 is a slit (slender gap). In this embodiment, the opening 227 is called an energy beam transmitting portion that allows an energy beam (the laser light 211 in this embodiment) to pass through this portion. The irradiation area at a site above the modeling stage 201 is locally covered by this cover 204 to prevent the fumes 218 from diffusing into the chamber 210, dwelling in a space through which the laser light 211 passes, and adhering onto the laser transmitting window 212.

The structure of the cover 204 is further described in detail with reference to FIGS. 11 to 14. The cover 204 of this embodiment includes a mechanism that prevents the fumes 218 in the chamber 210 from diffusing, and is for reducing the adverse effect on the laser light 211 passing through the energy beam transmitting portion 227 of the cover 204. As described later, this mechanism can be made up of a stream regulating mechanism that regulates the fumes so as to flow in a direction apart from the laser light 211, for example.

In this embodiment, to allow the laser light 211 to pass through the energy beam transmitting portion 227, the cover 204 is provided with a moving device that moves the cover 204 according to laser scanning by the laser scanning apparatus 209. For example, the moving device may be achieved using a moving stage 226 (FIG. 9).

The moving stage 226 in FIG. 9 corresponds to linear-moving stages 226a (FIG. 12) and 226b (FIGS. 15 and 16) described later. It is herein assumed that the energy beam transmitting portion 227 has a linear shape (e.g., FIGS. 11 and 12) covering one scanning direction in two-dimensional scanning with the laser light 211. In this case, the moving stage 226 (FIG. 9) is configured as the linear-moving stage 226a (FIG. 12) that can move the cover 204 at least in a scanning direction crossing the energy beam transmitting portion 227. The energy beam transmitting portion 227 may have a cross shape (e.g., in FIGS. 15 and 16) that covers a pair of two-dimensional scanning directions (X and Y two axes) with the laser light 211, for example. In this case, the moving stage 226 (FIG. 9) may be configured as an XY stage (226*b* in FIGS. 15 and 16) that can move the cover 204 along both of XY axes. This configuration is described later in detail in Embodiment 6.

Figure 16:
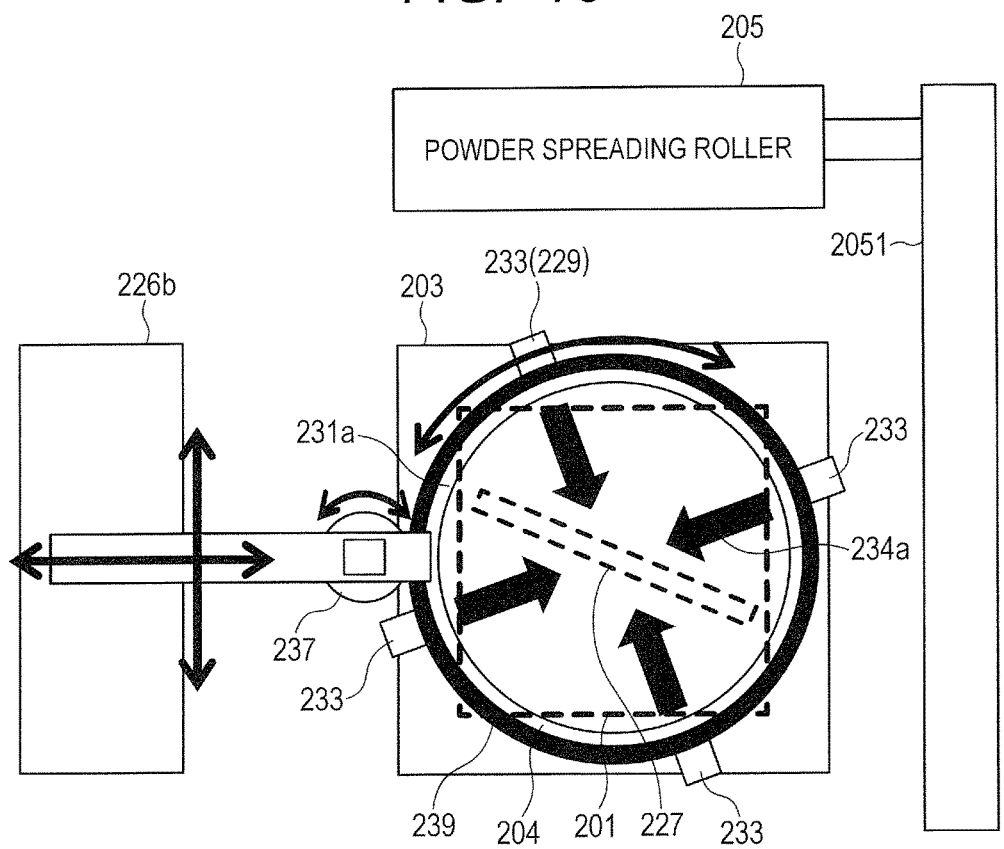
FIG. 16 is a top view illustrating a configuration example (Embodiment 7) of the cover and its drive mechanism of the three-dimensional modeling apparatus of FIG. 9.

Scanning with the laser light 211 is not necessarily limited to linear scanning in an orthogonal manner with respect to the modeling stage 201 (or both the XY-axes). In a certain modeling condition, there can be a case of intending scanning with the laser light 211 in a direction inclined from the modeling stage 201 (or both the XY-axes). In this case, the energy beam transmitting portion 227 of the cover 204 is required to have a configuration that can incline this portion along one scanning direction of the laser light 211 as illustrated in FIG. 16. In the example in FIG. 16, the cover 204 can be linearly moved along both the XY-axes and rotated about the Z-axis (corresponding to the vertical direction in FIG. 9, for example) by the moving stage 226 (FIG. 9). The cover 204 can perform scanning along both the XY-axes by the XY stage 226*b*, and control the rotation attitude about the energy beam transmitting portion by a rotation roller 237, for example.

The moving stage 226 in FIG. 9 can thus have the configuration that moves (scans) the cover 204 in the directions (2041) along one or two axes (X and Y) of laser scanning. Furthermore, in a case where scanning with the laser light 211 in a direction inclined from the XY plane of the modeling stage 201 is required, the moving stage 226 can have a configuration allowing the cover 204 to rotate about an axis (Z-axis or an axis parallel thereto) orthogonal to the XY plane. This configuration is described later in detail in Embodiment 4.

As described above, the operation of moving the cover 204 by the moving stage 226 according to the scanning by the laser scanning apparatus 209 with the laser light 211 can be achieved by control of synchronizing both the elements by the controlling mechanism 220.

The controlling mechanism 220 can be constituted by including a CPU 221, which may be, for example, a general purpose microprocessor, ROM 222 and RAM 223. The controlling mechanism 220 applies supply control of the material powder of the powder spreading roller 205, up-and-down control of the up-and-down mechanism 202 of the modeling stage 201, turning-on control of the laser light source 2091, and scanning control by the laser scanning apparatus 209, thereby controlling the operation of the entire three-dimensional modeling. According to advancement of the three-dimensional modeling operation, the inert gas supplying mechanism 215 and the fume collecting mechanism 216 are controlled.

In particular, the three-dimensional modeling operation performs irradiation with the laser light 211 through the energy beam transmitting portion 227 of the cover 204. Thus, the controlling mechanism 220 controls the moving stage 226 to move the cover 204 so as to allow the laser light 211 to pass always through the energy beam transmitting portion 227 in synchronization with the scanning control by the laser scanning apparatus 209. The control of moving (scanning) the cover 204 by the moving stage 226 is described later in detail.

Control procedures for allowing the controlling mechanism 220 to control the three-dimensional modeling operation that includes control of moving (scanning) the cover 204 can be stored as control program executed by the CPU 221, for example, in the ROM 222. The CPU 221 uses the RAM 223 as a work area when executing the control program. When the control program is recorded (stored) in the ROM 222 (external storing devices, such as various types of flash memories and HDD, not illustrated), these recording media constitute a computer-readable recording medium that stores control procedures for executing the present invention. A program for executing control procedures, described later, may be stored in a fixed recording medium, such as ROM or HDD. Alternatively, the program may be stored in a detachable computer-readable recording medium, such as various flash memories or an optical (magnetic) disk. Such a storing scheme can be used for a case of installing or updating the control program for executing the control procedures of the present invention. When the program for executing the control procedures of the present invention is installed or updated, the detachable recording medium as described above may be used. Alternatively, a scheme of downloading the program via a network (intranet), not illustrated, may be used.

Furthermore, a display unit 224 that includes a liquid crystal display, and an operating unit 219 that includes a keyboard (and additionally a pointing device, such as a mouse) can be connected to the controlling mechanism 220. The display unit 224 is used to display advancement of the three-dimensional modeling operation and control parameters for setting. The operating unit 219 issues instructions of activation and (temporary) stopping of the three-dimensional modeling operation, and is used to input the control parameters for setting.

Figure 12:
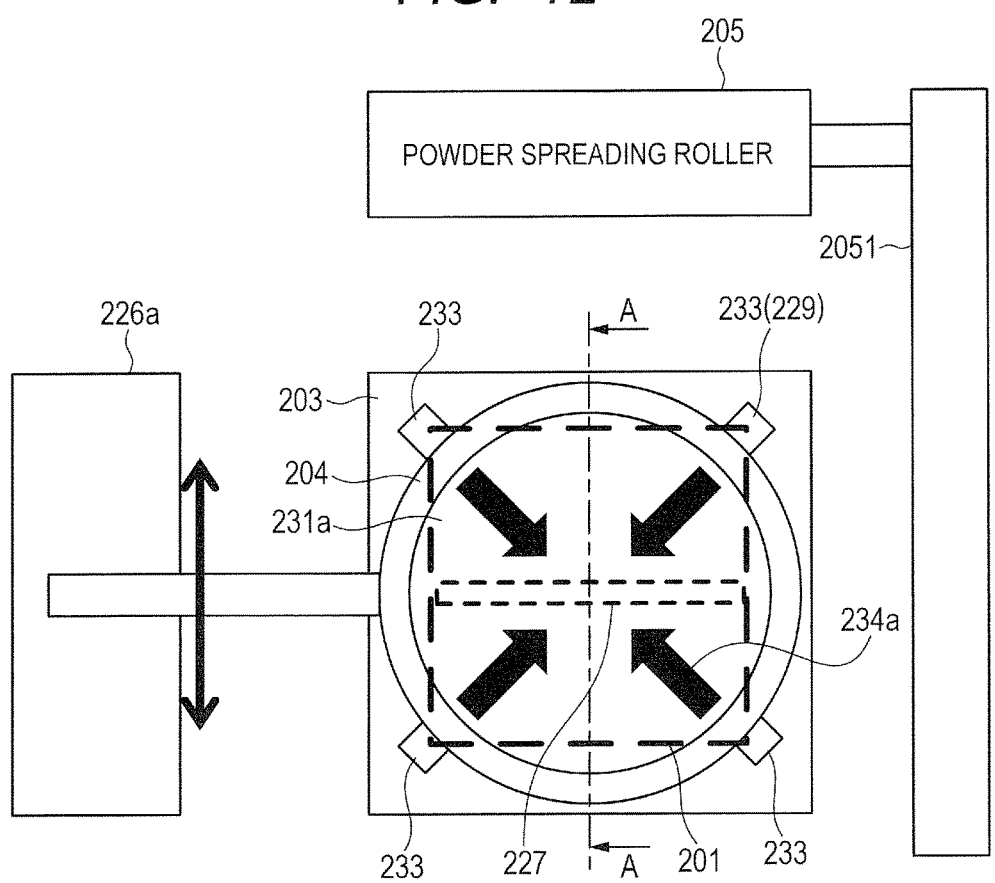
FIG. 12 is a top view illustrating the configuration example (Embodiment 4) of the cover and its drive mechanism of the three-dimensional modeling apparatus of FIG. 9.
Figure 13:
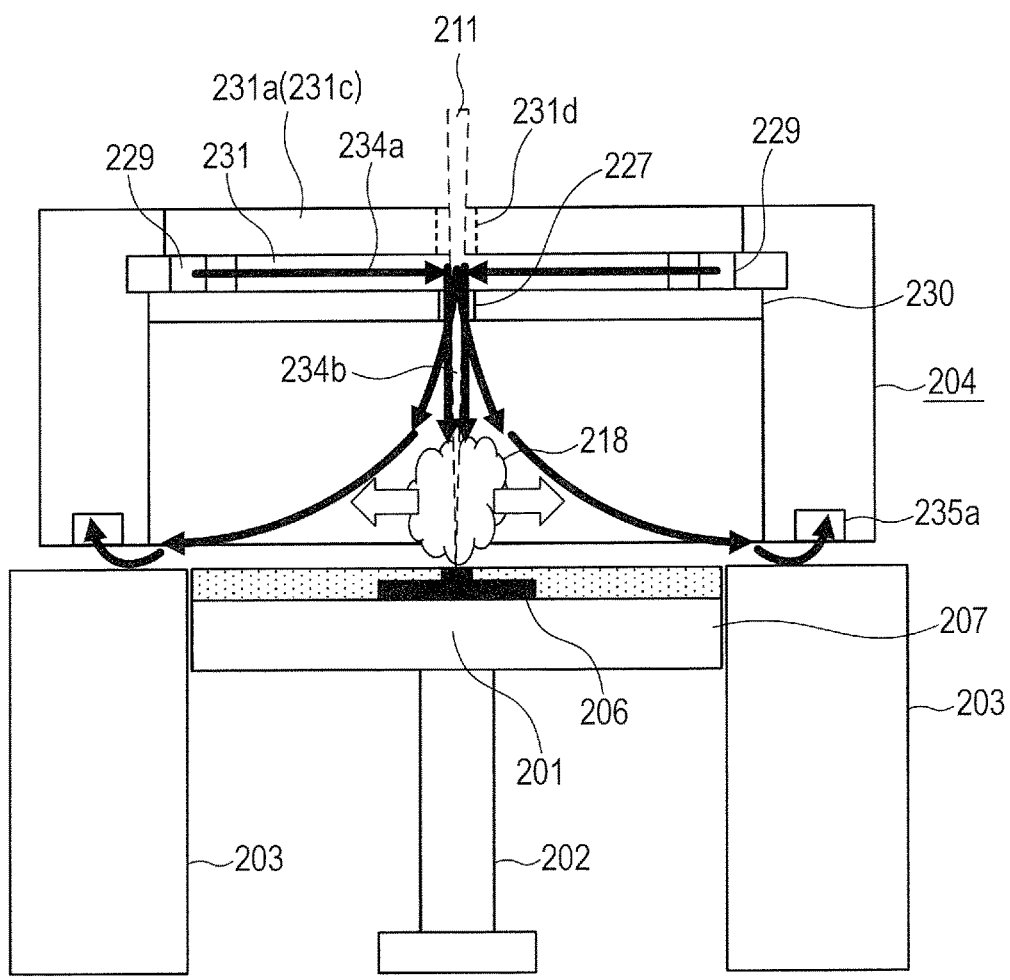
FIG. 13 is a sectional view illustrating the configuration example (Embodiment 4) of the cover of the three-dimensional modeling apparatus of FIG. 9.

Referring to FIGS. 11 to 13, a configuration example of the cover 204 is described. In FIGS. 11 to 13, in particular, the aerodynamic configuration of the cover 204, particularly, the stream regulating mechanism that regulates the fumes so as to flow in a direction apart from the vicinity of the energy beam transmitting portion 227, is also described. FIG. 11 is a perspective view of the cover. FIG. 12 is a top view of the cover. FIG. 13 is a sectional view in the A direction illustrated in FIG. 12. The cover 204 is provided on the modeling stage 201 to enclose the fumes 218 (FIG. 10) caused by modeling so as not to diffuse to the outside of the local space of the cover 204, and surrounds the solidified layer 206 during modeling.

As illustrated in FIG. 11, a main portion of the cover 204 is made of material, such as for example metal or resin, to have a cylindrical shape that is open at the bottom on the modeling stage 201 side. That is, the main portion of the cover 204 includes a circular pressure divider plate 230 that is an upper plate, and a side wall 204*a* formed to surround the periphery of the lower surface. The pressure divider plate 230 and the side wall 204*a* may be integrally configured. Alternatively, these two elements are coupled to each other by measures, such as adhesion, welding or screws. In an appropriate mode, these elements may be bonded hermetically.

The energy beam transmitting portion 227 that allows the laser light 211 to pass is formed along the direction of the diameter of the pressure divider plate 230 that is the upper plate of the cover 204, for example.

The pressure divider plate 230 constituting the upper plate of the cover 204 is arranged at a position lower than the top portion of the side wall 204*a*, as illustrated in the diagram. A laser transmitting material 231*a* made of material, such as for example (heatproof) glass, that allows the laser light 211 to pass is coupled to the top portion of the side wall 204*a* by adhesion or another method; in an appropriate case, the material is coupled hermetically.

Thus, a pressure chamber 231 is formed between the pressure divider plate 230, which constitutes the upper plate of the cover 204, and the laser transmitting material 231*a*. In the pressure chamber 231, at a portion above the pressure divider plate 230 on the side wall 204*a*, the openings 229 of the cover 204 are formed. In FIG. 11, the openings 229 are illustrated at the two sites. However, any number of openings may be formed. For example, in a case where openings 229 are formed at four sites, the openings are caused to communicate with the respective fittings 233 (ducts) illustrated in FIG. 12.

These fittings 233 communicate with the inert gas supply path of the inert gas supplying mechanism 215 (FIG. 9). Thus, through the fittings 233 and openings 229 at the four sites, the inert gas can be supplied into the pressure chamber 231 at the portion above the pressure divider plate 230.

The cover 204 is thus provided with the energy beam transmitting portion 227 that allows the laser light 211 to pass. Consequently, the sites of the pressure divider plate 230 and the side wall 204a may be made of, for example, light-shielding nontransparent material. However, the light-shielding properties of the pressure divider plate 230 and the side wall 204a are not indispensable requirement.

Furthermore, as illustrated in FIG. 13, at the lower edge portion of the cover 204, the collection path 235a is provided that is for the inert gas and has a circularly arranged groove shape, for example. The collection path 235a is allowed to communicate with the collection path 235c toward the duct collecting box 208 indicated by a broken line in FIG. 9. The collection path 235a of the cover 204 and the collection path 235c can be coupled through a communication path (not illustrated), which is analogous to the fittings 233.

The pressure chamber 231 above the pressure divider plate 230, the openings 229, the energy beam transmitting portion 227, and the collection path 235a at the lower edge of the cover 204 constitute the stream regulating mechanism that regulates the flows of the gas in the cover 204 (arrows 234a and 234b in FIGS. 12 and 13).

That is, as illustrated in FIG. 13, during modeling by irradiation with the laser light 211, the inert gas at the positive pressure is supplied from the inert gas supplying mechanism 215 (FIG. 9) through the openings 229. Meanwhile, the negative pressure of the fume collecting mechanism 216 is applied through the duct collecting box 208 (FIG. 9) to the collection path 235a at the lower edge of the cover 204. The positive pressure of the pressure chamber 231 above the pressure divider plate 230 and the negative pressure below the pressure divider plate 230 cause a pressure difference between the portions above and below the pressure divider plate 230. The gas flows in the cover 204 are regulated as indicated by the arrow 234a in FIGS. 12 and 13 and the arrow 234b in FIG. 13.

That is, the inert gas having flown from the openings 229 (, 229 . . . ) concentrates toward the energy beam transmitting portion 227 of the pressure divider plate 230 as indicated by the arrow 234a in FIGS. 12 and 13. As indicated by the arrow 234b in FIG. 13, the stream blows downward from the energy beam transmitting portion 227, and flows in the direction of the collection path 235a by the negative pressure applied from the collection path 235a at the lower edge of the cover 204.

As described above, the gas flows in the cover 204 are regulated as indicated by the arrows 234a and 234b. That is, in the pressure chamber 231, the gas stream is regulated to flow from the openings 229 toward the energy beam transmitting portion 227 of the pressure divider plate 230 (arrow 234a). In the irradiation area below the cover 204 and above the solidified layer 206, the fumes 218 are regulated so as to flow in the direction of the collection path 235a by the negative pressure applied from the collection path 235a at the lower edge of the cover 204 (arrow 234b).

That is, the fumes 218 caused by irradiation with the laser light 211 are regulated so as to flow downward from the energy beam transmitting portion 227, and are regulated so as to flow toward the collection path 235a around the lower edge of the cover 204. The positive pressure of the pressure chamber 231 and the negative pressure from the collection path 235a at the lower edge of the cover 204 are applied. Consequently, the atmosphere including the fumes 218 is collected through the collection path 235a without leaking through the cover 204 and diffusing.

As described above, the stream regulating function of the cover 204 can be achieved. Consequently, the fumes 218 caused by irradiation with the laser light 211 are enclosed in the local space in the cover 204. For example, diffusion of the fumes 218 into the chamber 210 can be suppressed.

That is, according to the above configuration, the pressure chamber 231 is arranged above the energy beam transmitting portion 227, and the inert gas is supplied from the inert gas supplying mechanism 215 (FIG. 9) at the positive pressure. Meanwhile, the negative pressure of the fume collecting mechanism 216 is applied through the duct collecting box 208 (FIG. 9) to the collection path 235a at the lower edge of the cover 204. Consequently, the stream can be regulated (234b) so as to blow the inert gas downward from the pressure chamber 231 through the energy beam transmitting portion 227. The stream regulation occurs so that the fumes 218 do not approach from the passage through which the laser light 211 passes and which is around the energy beam transmitting portion 227 and instead do flow apart therefrom. Consequently, reduction in laser irradiation intensity due to the fumes 218 in the passage through which the laser light 211 passes around the energy beam transmitting portion 227 can be suppressed.

The fumes 218 caused by irradiation with the laser light 211 flow quickly and eccentrically toward the collection path 235a at the lower edge of the cover 204 so as to flow apart from the upper portion of the solidified layer 206, and are collected through the collection path 235a. Consequently, reduction in laser irradiation intensity due to diffusion of the fumes 218 into the chamber 210 and, for example, adhesion of the fumes 218 onto the laser transmitting window 212 can be suppressed.

As described above, the cover 204 of this embodiment can effectively prevent diffusion of the fumes 218 caused around the modeling stage 201 accompanying irradiation with the laser (energy beam). Thus, reduction in laser irradiation intensity due to the fumes 218 is suppressed, which can achieve highly accurate three-dimensional modeling.

Here, referring to FIG. 12, control of moving (scanning) the cover 204 through the moving stage 226 executed by the controlling mechanism 220 during three-dimensional modeling is described.

FIG. 12 illustrates a portion of the modeling table 203 that surrounds the modeling stage 201 (broken lines) in view from the top in FIG. 9. The left direction of FIG. 9 corresponds to the upper direction of FIG. 12. The modeling stage 201 has a rectangular shape (square) as indicated by the broken lines, for example. The controlling mechanism 220 can control the roller drive mechanism 2051 to reciprocate the powder spreading roller 205 across the modeling stage 201. For example, prior to formation of one solidified layer 206 (FIGS. 9 and 13), the controlling mechanism 220 causes the roller drive mechanism 2051 to move the powder spreading roller 205 above the modeling stage 201. Consequently, an appropriate amount of material powder is supplied from a supply container, not illustrated, onto the modeling stage 201 and the solidified layer 206 having already formed on this stage.

Subsequently, the controlling mechanism 220 retracts the powder spreading roller 205 to the initial (retracted) position in FIG. 12, turns on the laser light source 2091, and starts two-dimensional (XY) scanning with the laser light 211 by the laser scanning apparatus 209. The two-dimensional (XY) scanning can be performed using, for example, two Galvano mirrors. In this case, scanning with the laser light 211 in the main scanning (X) direction is performed using one Galvano mirror. After completion of one main scanning, the reflection direction of the laser light 211 is switched in the sub-scanning (Y) direction by the other Galvano mirror.

In FIG. 12, the rectangular range indicated by the broken lines has the shape of the top surface of the modeling stage 201 and, for example, corresponds to a scanning range irradiated (scanned) with the laser light 211 by the two-dimensional (XY) scanning. Here, in FIG. 12, the main scanning (X) direction of the laser light 211 corresponds to the horizontal direction in the diagram, for example, and the sub-scanning (Y) direction corresponds to the vertical direction in the diagram, for example. In this case, the energy beam transmitting portion 227 of the cover 204 is arranged along the main scanning (X) direction of the laser light 211.

In such a configuration, it is a matter of course that in formation of one solidified layer 206, the controlling mechanism 220 controls the laser scanning apparatus 209 to irradiate the modeling stage 201 with the laser light 211 at an irradiation pattern required to form the layer. When one scan with the laser light 211 in a certain main scanning (X) direction, the controlling mechanism 220 controls the linear-moving stage 226a to move the cover 204 to a position where the laser light 211 toward the irradiation point can pass through the energy beam transmitting portion 227. Furthermore, the controlling mechanism 220 moves the linear-moving stage 226a in FIG. 12 in the sub-scanning (Y) direction by a sub-scanning pitch every time of completion in the main scanning (X direction). Synchronous control of the laser scanning and movement of the cover 204 as described above can scan the range on the modeling stage 201 that is required to be heated, with the laser light 211 having passed through the energy beam transmitting portion 227.

The controlling mechanism 220 operates the inert gas supplying mechanism 215 and the fume collecting mechanism 216 in the period of the heating and three-dimensional modeling operation by the laser scanning. That is, as described above, the inert gas is supplied by the positive pressure to the pressure chamber 231 of the cover 204, while the negative pressure is applied from the fume collecting mechanism 216 to the collection path 235a at the lower edge of the cover 204. Thus, in the period of the heating and three-dimensional modeling operation by laser scanning, the fumes (218) are regulated and collected as described above, and diffusion of the fumes (218) out of the cover 204 are suppressed. Consequently, dwelling of the fumes (218) around the energy beam transmitting portion 227 and contamination of the laser transmitting window 212 of the chamber 210 are prevented, and reduction in laser irradiation intensity due to the fumes 218 is prevented, which can achieve a highly accurate three-dimensional modeling.

In particular, in this embodiment, through synchronous control of laser scanning and movement of the cover 204, the laser irradiation range on the modeling stage 201 is synchronously controlled so that the cover 204 can keep a specific positional relationship with the energy beam transmitting portion 227. Roughly speaking, the positions of the cover 204 and the energy beam transmitting portion 227 are synchronously controlled so that the laser irradiation position on the modeling stage 201 is within a constant range at a lower portion of the substantial center between these elements. Consequently, the laser irradiation position that is a main site where the fumes 218 occur is controlled so as to coincide always with a substantial center of the stream regulating mechanism (FIG. 13) of the cover 204, described above. Thus, during modeling of one layer on the modeling stage 201, substantially uniform fume diffusion prevention and collection characteristics can be maintained. Throughout formation of one layer, laser irradiation characteristics without unevenness can be achieved. Highly accurate three-dimensional modeling can be performed.

Subsequently, variations where a part of configuration of the three-dimensional modeling apparatus described above is changed are described later as Embodiments 5 to 8. Also in the following embodiments, the basic configuration illustrated in FIGS. 9 to 13 is assumed to be the same. In particular, elements different from the configuration elements in Embodiment 4 described above are hereinafter described in detail. Redundant description of the other elements is omitted.

Embodiment 5

Figure 14:
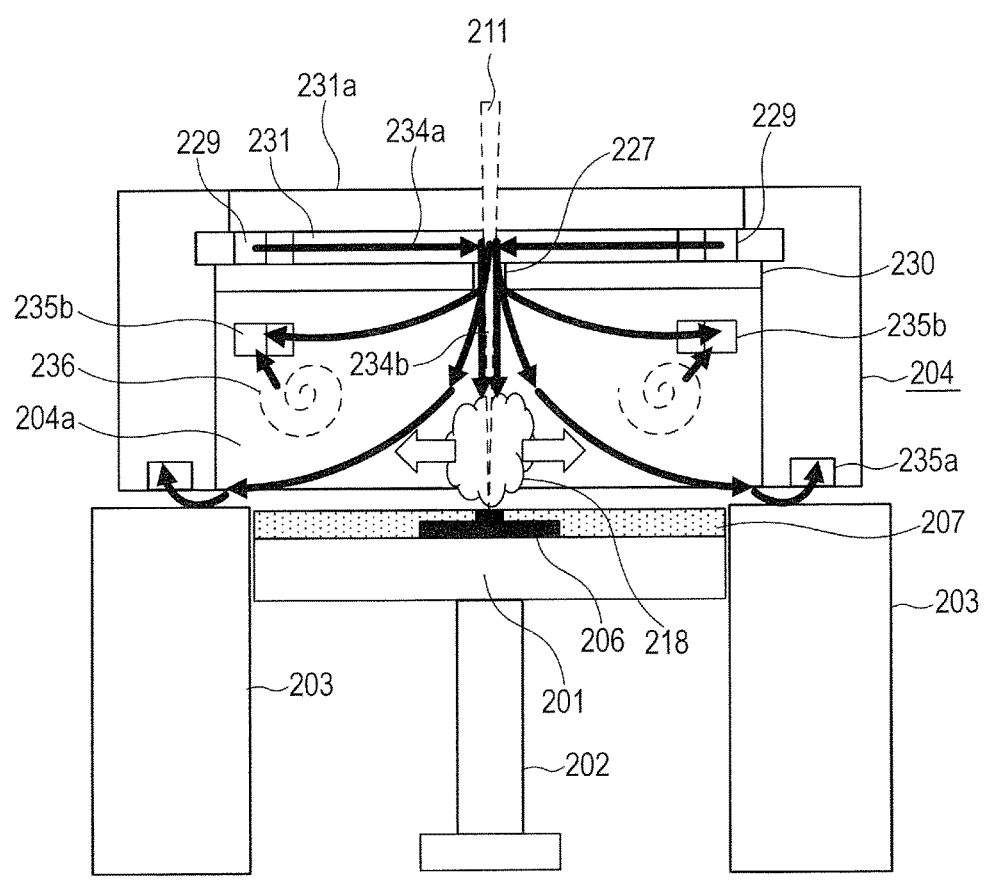
FIG. 14 is a sectional view illustrating a configuration example (Embodiment 5) of the cover of the three-dimensional modeling apparatus of FIG. 9.

In Embodiment 4 described above, the groove-shaped collection path 235a is arranged on the lower edge of the cover 204, and the negative pressure from the fume collecting mechanism 216 is applied to the collection path 235a, thereby collecting the fumes 218 (FIG. 13). The fume collection path may be arranged at a position other than the lower edge of the cover 204. For example, as illustrated in FIG. 14, one or more collection paths 235b (, 235b . . . ) may be arranged at a position higher than the lower edge of the side wall of the cover 204. As with the collection path 235a, the collection path 235b communicates with the collection path 235c toward the duct collecting box 208 of the fume collecting mechanism 216.

According to such a configuration, the fumes 218 can be collected not only from the collection path 235a but also from the collection path 235b.

The configuration without the collection path 235b as in FIG. 13 causes a possibility that the gas downstream (234b) flowing downward so as to be apart from the energy beam transmitting portion 227 causes vortices 236 at sites at the middle of height of the cover 204. Occurrence of such vortices 235 causes a possibility of contaminating the inner surface of the cover 204 owing to adhesion of the fumes 218. If a substance due to the fumes 218 adhering to the inner surface of the cover 204 is exfoliated and fall on the modeling stage 201, there is a possibility of affecting layer modeling under execution.

Meanwhile, as illustrated in FIG. 14, the collection path 235b is arranged at a relatively higher site on the side wall 204a of the cover 204, and a collection negative pressure is applied from the collection path 235b, thereby allowing the atmosphere in the cover to be regulated so as to flow toward the collection path 235b. That is, at the middle height of the cover 204, the atmosphere in the cover 204 can be collected without causing the vortices 236. Thus, adhesion to and contamination of the inner surface of the cover 204 can be suppressed. As described above, the collection path 235b is arranged at the relatively higher site on the side wall 204a of the cover 204. This arrangement can regulate the pressure and the distribution of the gas stream velocities, and effectively collect the fumes 218 without contaminating the inner wall of the cover 204.

Embodiment 6

In a case where multiple Galvano mirrors are included in the laser scanning apparatus 209, the scanning pattern of the laser light 211 is not limited to the simple scanning pattern where the linear main scanning is repeated while being moved in the sub-scanning direction, as described above. With a certain required shape of the model body, a case of scanning with the laser light 211 using scanning lines having different scanning directions can be considered.

Figure 15:
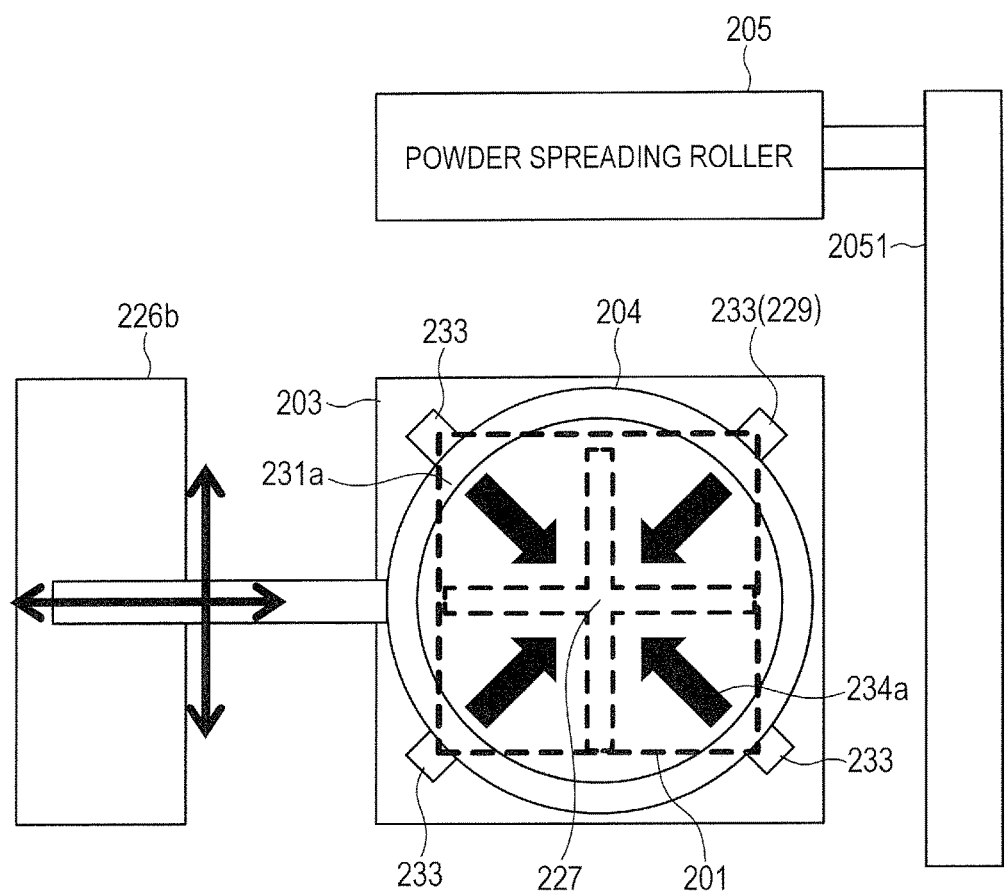
FIG. 15 is a top view illustrating the configuration example (Embodiment 6) of the cover and its drive mechanism of the three-dimensional modeling apparatus of FIG. 9.

Thus, the energy beam transmitting portion 227 arranged on the pressure divider plate 230 that is the upper plate of the cover 204 is not limited to one linear shape as illustrated in FIG. 12. Alternatively, it can be considered that multiple energy beam transmitting portions may be formed along different directions. For example, as described in Embodiment 4, it can be considered that the energy beam transmitting portion 227 has a cross shape made up of two lines orthogonal to each other as illustrated in FIG. 15. The configurations of the other members are analogous to the members described in Embodiment 4.

According to such a configuration, in a certain scanning section, scanning is performed with the laser light 211 through one of the two lines of the energy beam transmitting portion 227. In the other scanning section, scanning pattern can be used that performs scanning with the laser light 211 through the other one of the two lines of the energy beam transmitting portion 227. A scanning pattern can also be used that performs scanning so as to draw a cross shape literally indicated as this symbol while alternately switching the scanning direction of the laser light 211 in the orthogonal two-axis directions during modeling of one solidified layer.

In the case where the multiple energy beam transmitting portions 227 are formed at the upper portion of the cover 204 along the different directions, it is required to configure the moving stage 226 (FIG. 9) so as to move the cover 204 in multiple-axis directions as many as the number of scanning directions. For example, according to the configuration of the energy beam transmitting portion 227 having the cross shape orthogonal to each other as illustrated in FIG. 15, the moving stage 226 (FIG. 9) is configured as the linear-moving stage 226b that can move (scan) the cover 204 at least in the two-axis directions indicated by the intersecting arrows in the diagram. Such a linear-moving stage 226b can be configured as an XY stage, for example. The controlling mechanism 220 (FIG. 9) can perform control of determining the cover 204 moving (XY scanning) position by the linear-moving stage 226b according to the scanning pattern of the laser light 211 by the laser scanning apparatus 209.

Embodiment 7

As described in Embodiment 4, in a certain modeling condition for the model body, there can be a case of causing need of scanning with the laser light 211 in a direction inclined from the modeling stage 201 (or its XY axes). In this case, the moving device for the cover 204 is required to include a rotational moving mechanism that rotates the cover 204 (the energy beam transmitting portion 227 of this cover) along the direction of the scanning line of the laser light 211. For example, as illustrated in FIG. 16, a configuration is adopted where the cylindrical shape of the cover 204 is utilized, a circular-shaped rail 239 is arranged around the shape, the rail 239 is rotationally driven by the rotation roller 237, and the rotation attitude (angle) of the cover 204 can be selected. The configurations of the other members are analogous to the members described in Embodiment 4.

According to such a configuration, the controlling mechanism 220 (FIG. 9) can select the rotation attitude (angle) of the cover 204 where the direction of the energy beam transmitting portion 227 coincides with the direction of the scanning line of the laser light 211.

Consequently, this Embodiment 7 can support not only the main and sub-scanning directions that are orthogonal to in the vertical two-axis directions and cannot be supported by Embodiments 4 and 6, but also the direction of the scanning line of the other laser light 211. The configuration in FIG. 16 adopts the linear-moving stage 226b that can move (scan) the cover 204 in the two-axis directions as in FIG. 15. Consequently, also in the case of using the scanning line inclined from the modeling stage 201 (or its XY axes), the cover 204 can be moved (scanned) in at least two sub-scanning directions. According to such a configuration, also in the case of using the scanning line inclined from the modeling stage 201 (or its XY axes) by for example 30° or 45°, the controlling mechanism 220 (FIG. 9) can move the cover 204 so that the energy beam transmitting portion 227 can track the scanning line.

Embodiment 8

In FIG. 13, the upper portion of the pressure chamber 231 arranged above the pressure divider plate 230 serving as the upper plate provided with the energy beam transmitting portion 227 of the cover 204 is formed of the laser transmitting material 231a. The laser transmitting material 231a is made of light transmitting material that allows laser light (energy beam) to pass through this material. In this case, the laser transmitting material 231a serves as a part of the energy beam transmitting portion.

However, the member of the upper portion above the energy beam transmitting portion 227 is only required to be configured as an outer partition (laser transmitting portion). The laser transmitting material 231a, such as glass or resin, is not necessarily adopted.

Thus, as to the laser transmitting material 231a in FIG. 13, portions other than the portion provided with the opening 231d, which serves as the outer partition, at the upper portion of the energy beam transmitting portion 227 may be replaced with a plate member 231c made of metal or resin having a light-shielding property. The opening area and the shape of the opening 231d serving as the outer partition may be freely selected only if the shape does not interfere with the laser light 211. In this case, the opening 231d as the outer partition serves as a part of the energy beam transmitting portion.

In this case, according to an appropriate mode, the controlling mechanism 220 performs control so as to secure a sufficiently large pressure difference between the supply pressure into the chamber 210 by the inert gas supplying mechanism 215 and the negative pressure from the fume collecting mechanism 216 applied to the collection path 235a. Consequently, for example, the stream can be regulated so as not to cause any gas stream that flows upward from the pressure chamber 231 through the opening 231d.

According to such a configuration, the opening 231d of the plate member 231c that constitutes the upper portion of the pressure chamber 231 functions as the supply path of the inert gas as with the openings 229. The atmosphere of the cover 204 is regulated into the gas downstream (234b) as with Embodiment 4. Also according to such a configuration, the stream regulating mechanism substantially similar to that described in Embodiment 4 can be achieved, and the fumes 218 caused by irradiation with the laser light 211 can be collected through the collection path 235a at the lower edge of the cover 204.

In a certain condition of balance between the supply pressure into the chamber 210 by the inert gas supplying mechanism 215 and the negative pressure from the fume collecting mechanism 216 applied to the collection path 235a, the configuration from which the pressure chamber 231 is removed can be adopted.

Figure 17:
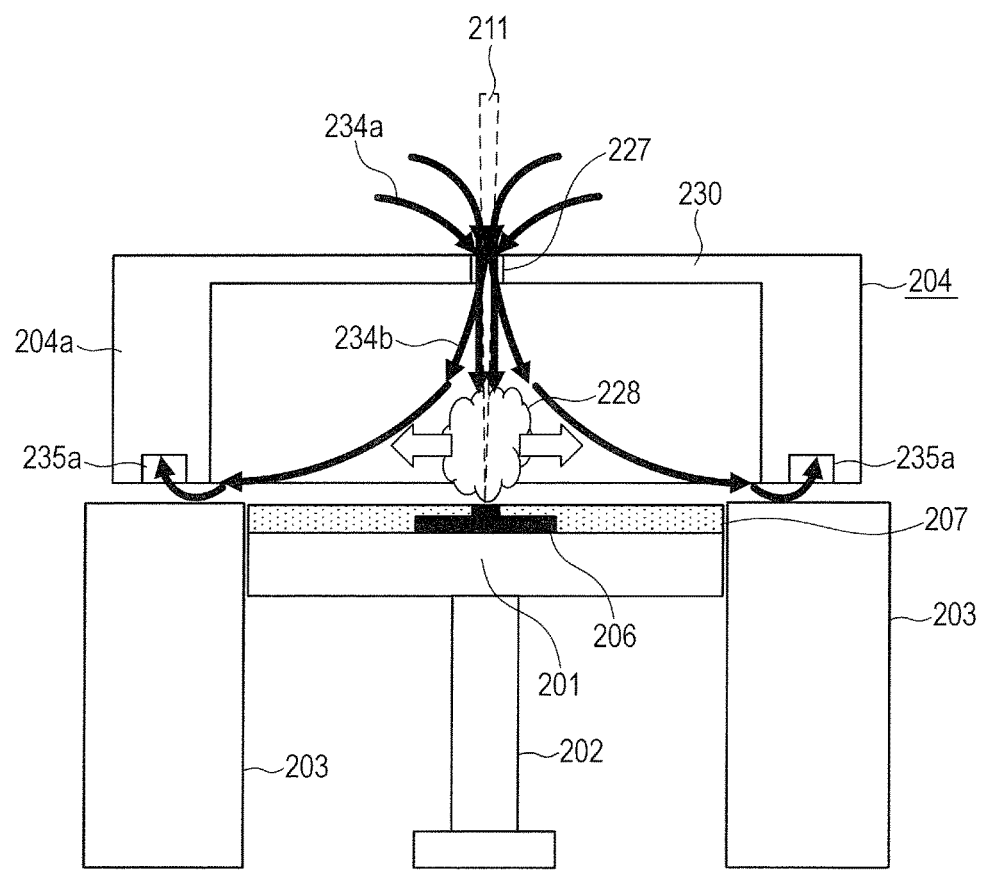
FIG. 17 is a sectional view illustrating a configuration example (Embodiment 8) of a cover of a three-dimensional modeling apparatus that is an implementation of the present invention.

For example, as illustrated in FIG. 17, in the configuration, the cover 204 is made up only of the pressure divider plate 230 (upper plate) where the energy beam transmitting portion 227 is formed and the cylindrical-shaped side wall 204a, and the pressure chamber 231 described above is omitted. FIG. 17 illustrates the sectional structure that includes the cover 204 above the modeling table 203 in a manner analogous to that in FIG. 13 (Embodiment 4) and FIG. 14 (Embodiment 5). In the configuration in FIG. 17, it is a matter of course that the controlling mechanism 220 causes the inert gas supply pressure into the chamber 210 by the inert gas supplying mechanism 215 to be a positive pressure, while causing the collection pressure applied to the collection path 235a by the fume collecting mechanism 216 to be a negative pressure.

In the configuration in FIG. 17, the energy beam transmitting portion 227 functions as the passage for the laser light 211, while functioning as the inert gas supply path into the cover 204 as with the openings 229 in FIG. 13. That is, also in the configuration in FIG. 17, the pressure difference can be caused between the portions above and below the pressure divider plate 230. The gas in the cover 204 is apart from the vicinity of the energy beam transmitting portion 227 as illustrated in the diagram, and can be regulated to form the gas downstream (234b) flowing toward the collection path 235a around the lower edge. Thus, as with the case of Embodiment 4, the fumes 218 caused by irradiation with the laser around the energy beam transmitting portion 227 are prevented from dwelling and adhering. The caused fumes 218 are locally enclosed in the cover 204 and the diffusion of the fumes into the chamber 210 is suppressed. Consequently, contamination in the chamber 210 and on the laser transmitting window 212 at the ceiling of this chamber is prevented, and reduction in laser irradiation intensity due to the fumes 218 is suppressed, which can achieve a highly accurate three-dimensional modeling.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-068675, filed Mar. 30, 2016, and Japanese Patent Application No. 2016-140690, filed Jul. 15, 2016, which are hereby incorporated by reference herein in their entirety.

What is claimed is:

1. The three-dimensional modeling apparatus that performs three-dimensional modeling by repeatedly scanning a modeling material arranged on a modeling stage with an energy beam to form a solidified layer, comprising:
    a cover that includes a side wall, an energy beam transmitting portion that allows the energy beam to pass, a member having an opening formed by a gap at a lower portion of the energy beam transmitting portion, and a gas supplying opening for supplying gas to the gap, wherein the cover blows, downward from the opening, the gas supplied to the gap; and
    a moving device that moves the cover so as to allow the energy beam to pass through the energy beam transmitting portion, according to scanning with the energy beam.

2. The three-dimensional modeling apparatus according to claim 1, further comprising a chamber that accommodates the modeling stage and the cover, and includes a light transmitting window that allows the energy beam emitted from a generation source arranged outside of the chamber to pass.

3. The three-dimensional modeling apparatus according to claim 1, wherein the side wall is open on a side facing the modeling stage.

4. The three-dimensional modeling apparatus according to claim 1, wherein the gas is supplied from a gas supplying mechanism through the opening to the gap.

5. The three-dimensional modeling apparatus according to claim 1, wherein multiple energy beam transmitting portions are formed at the cover along different directions.

6. The three-dimensional modeling apparatus according to claim 1, wherein the moving device moves the cover in one direction determined according to a scanning direction of the energy beam when moving the cover.

7. The three-dimensional modeling apparatus according to claim 1, wherein the moving device includes a rotational moving mechanism that rotates the cover so as to allow the energy beam to pass through the energy beam transmitting portion according to a direction of scanning with the energy beam.

8. The three-dimensional modeling apparatus according to claim 1, wherein the energy beam is laser light.

9. The three-dimensional modeling apparatus according to claim 1, wherein the opening is a linear slit.

10. The three-dimensional modeling apparatus according to claim 1, wherein the opening is a cross-shaped slit.

11. The three-dimensional modeling apparatus according to claim 1, wherein the energy beam transmitting portion is formed from glass.

12. The three-dimensional modeling apparatus according to claim 1, wherein the cover has a fume collecting port for collecting fume.

13. The three-dimensional modeling apparatus according to claim 2, wherein the chamber further includes a gas supplying opening for supplying gas into the chamber so as to contain the fume in the cover.

* * * * *